US006404868B1

(12) United States Patent
Beamish et al.

(10) Patent No.: US 6,404,868 B1
(45) Date of Patent: *Jun. 11, 2002

(54) PEER-TO-PEER TRANSFER USING PRE-EXISTING CALLER ID CLASS FSK SIGNALING INFRASTRUCTURE

(75) Inventors: Norman J. Beamish, Costa Mesa; Robert S. Saunders, Irvine; John S. Walley, Lake Forest; Raymond Hon Mo Yung, Irvine, all of CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/363,989

(22) Filed: Jul. 16, 1999

Related U.S. Application Data

(63) Continuation-in-part of application No. 09/328,048, filed on Jun. 8, 1999.

(51) Int. Cl.[7] .............................................. H04M 1/56
(52) U.S. Cl. ............................ 379/142.01; 379/142.04; 379/142.07; 379/215
(58) Field of Search .................................. 379/142, 372, 379/373, 93.01, 93.02, 93.03, 93.17, 93.23, 93.31, 67.1, 69, 74, 88.11, 88.19, 88.2, 88.21, 90.01, 142.01, 142.04, 142.07, 142.14, 142.16, 142.17, 242, 243, 245, 247

(56) References Cited

U.S. PATENT DOCUMENTS

| 5,036,513 A | * | 7/1991 | Greenblatt ................... 370/125 |
| 5,365,577 A | * | 11/1994 | Davis et al. .............. 379/93.01 |
| 5,367,563 A | * | 11/1994 | Sainton ..................... 379/93.01 |
| 5,481,594 A | * | 1/1996 | Shen et al. ..................... 379/67 |
| 5,524,141 A | * | 6/1996 | Braun et al. .............. 379/93.01 |
| 5,896,443 A | * | 4/1999 | Ditcher ..................... 379/93.08 |
| 6,041,111 A | * | 3/2000 | Shelton ....................... 379/201 |
| 6,058,172 A | * | 5/2000 | Lim et al. .................... 379/142 |
| 6,122,353 A | * | 9/2000 | Brady et al. ................. 379/142 |
| 6,134,317 A | * | 10/2000 | Shaffer et al. .............. 379/243 |

FOREIGN PATENT DOCUMENTS

| WO | WO 98/15095 | 4/1998 |
| WO | WO 99/31857 | 6/1999 |

* cited by examiner

Primary Examiner—Curtis Kuntz
Assistant Examiner—Quoc D. Tran
(74) Attorney, Agent, or Firm—Procopio, Cory, Hargreaves & Savitch, LLP

(57) ABSTRACT

A communications device configured to receive FSK-encoded CLASS caller ID information is also configured to exchange FSK-encoded data with a peer device over a channel previously established between the two devices. In one embodiment, the channel is a voice channel previously established between the two devices.

10 Claims, 17 Drawing Sheets

PEER-TO-PEER TRANSFER USING PRE-EXISTING CALLER ID CLASS FSK SIGNALING INFRASTRUCTURE

RELATED APPLICATIONS

This application is a continuation-in-part of U.S. application Ser. No. 09/328,048 filed on Jun. 8, 1999.

FIELD OF THE INVENTION

This invention relates generally to a method and apparatus for data transfer using FSK signals and in particular to peer to peer data communication using pre-existing caller ID CLASS FSK signaling infrastructure.

BACKGROUND OF THE INVENTION

Introduction of SS7 switching in central office switching systems provided the technological capability to introduce caller ID services to customers. Caller ID services utilize the ability of a modern call switching and routing system, referred to in the telecommunications industry as a Stored Program Control System (SPCS), to record and provide to a call recipient information regarding the calling party in a Calling Party Number Message (CPN Message). This information, commonly referred to as caller ID information, may comprise the calling party's telephone number or name.

Telephones capable of displaying caller ID information are increasingly common. In fact, caller ID services are one of a group of network-provided enhanced services known as custom local area signaling services (CLASS). Telecordia Technologies, Inc., Morristown, N.J., originally Bellcore, has defined three classes of caller ID services, known respectively as Type I, Type II, and Type III. In the Type I service, a phone is equipped with a Frequency Shift Key (FSK) detector, a controller, and a display. When a call is placed to the phone, a SPCS server situated within the Public Switched Telephone Network (PSTN) activates a corresponding FSK generator also situated within the PSTN to transmit to the phone a FSK signal encoding the caller ID information. At the phone, as indicated in FIG. 1, when a first ring is detected, step 100, the controller enables the FSK detector, step 102, which listens for a FSK signal. If a FSK signal is detected before the second ring, the Yes branch of decision point 104, it is demodulated to obtain the caller ID information. That information is then displayed, step 106. If, however, the FSK signal is not detected before the second ring, the No branch of decision point 104, the FSK detector is disabled, step 110.

In the Type II or Type III service, a phone is also equipped with a Customer Premises Equipment Alerting Signal (CAS) detector. When a call is placed to the phone, as illustrated in FIG. 5, the SPCS server first determines if the phone is on-hook or off-hook. If on-hook, the procedure described for the Type I category of service is followed. If off-hook, step 250, a call waiting/caller ID service is provided in which the server first activates a corresponding CAS generator situated within the PSTN to generate and transmit a CAS signal to the phone, step 252. The CAS detector at the phone, which has been previously enabled by the controller upon the occurrence of the off-hook condition, listens for the CAS signal, indicated by the No loopback to the beginning of decision point 254. Upon detecting the CAS signal, indicated by the Yes branch of decision point 254, the controller mutes the audio channel at the phone, step 256, and sends a Dual Tone Multi-Frequency (DTMF) tone, which serves as an acknowledgement signal. In the case of a Type II unit, the acknowledgement signal is a DTMF 'D' tone; in the case of a Type III unit, the acknowledgement signal is a DTMF 'A' tone. Muting of the audio channel is required since the FSK signal in one implementation is transmitted at a range of frequencies, 500–2500 Hz, which is within the audio band of 0 to about 3000 Hz.

The controller then enables the FSK detector, step 258, which listens for an FSK signal. If a FSK signal is detected before a predetermined timeout period, indicated by the Yes branch of decision point 260, the FSK signal is demodulated and the caller ID information obtained and displayed, step 262. If there is a timeout before the FSK signal is detected, indicated by the No branch of decision point 260, the controller un-mutes the audio channel, step 264, and resumes listening for a CAS signal, indicated by the branch from block 264 to the beginning of decision point 254.

As indicated, the process for the Type III service is identical to that of the Type II category, except that the acknowledgement signal is a DTMF 'A' tone. This identifies the Customer Premises Equipment (CPE), that is, the phone, as a Type III unit.

An Analog Display Services Interface (ADSI) is a Telecordia-defined interface and related protocol for bidirectional transmission of data between a SPCS server and an ADSI-compatible phone. The interface is such that an ADSI-compatible phone is backward compatible with a Type III phone. Data transmission to the phone is achieved via the FSK receiver already present in the phone. In early embodiments, data transmission from the phone was achieved by DTMF tones. In later embodiments, a FSK generator was added to a Type III phone, and data transmission from the phone originated from the FSK generator.

The class of services which can be supported through the ADSI is limited to those services which involve communication between a SPCS server and an ADSI-compatible phone, such as the transmission or reception of e-mail messages. However, services involving peer-to-peer communication, that is, direct communication between two CPEs, is not supported by the ADSI even though such services are desirable and unmet by the services supported by the ADSI interface.

Furthermore, it would be desirable to offer such services using the existing infrastructure for caller ID and ADSI services to the extent possible.

Therefore, a need exists for a data communication mechanism that allows peer-to-peer transmission of data over a telecommunications network using the existing infrastructure for CLASS Caller ID FSK signals.

SUMMARY OF THE INVENTION

In accordance with the purpose of the invention as broadly described herein, there is provided a method and apparatus for transmitting data between peer CPEs over a telecommunications network using the Caller ID CLASS FSK signaling infrastructure. In one implementation, the telecommunications network is a telephone network such as the PSTN.

In one embodiment, a CPE is a device known as a dataphone. In one implementation, the dataphone is an ADSI-compatible telephone to which is added a CAS generator. In another implementation, the dataphone is a Type II or Type III phone to which is added an FSK generator and a CAS generator.

However derived, the dataphone includes a CAS detector, an FSK receiver, a CAS transmitter, an FSK transmitter, a controller, and a display configured to provide peer-to-peer data communication functionality. In one implementation, these components are also configured to provide ADSI-compatible functionality. In a second implementation, these components are also configured to provide Type II or Type III caller ID functionality. In one implementation, the dataphone further includes a CODEC, a user interface such as a keypad, and a storage device, such as computer memory accessible by the controller.

The CAS generator is configured to generate a CAS signal upon being enabled by the controller. The CAS detector is configured to detect an incoming CAS signal from a calling dataphone upon being enabled by the controller. The FSK generator, upon being enabled by the controller, is configured to transmit to a target dataphone information in the form of FSK signals. The FSK receiver, upon being enabled by the controller, is configured to receive incoming FSK signals from a calling dataphone, and demodulate the same to provide the underlying information.

A peer-to-peer data communication proceeds as follows, it being assumed that a call has previously been made by the calling dataphone to a target dataphone, and a circuit established between the two over the telecommunications network (which in one implementation is the PSTN) upon the target phone being place in an off-hook condition. Accordingly, it is further assumed that the CAS detector of the target dataphone has been enabled in accordance with Type II or Type III functionality.

First, a CAS signal is generated by the CAS generator in the calling dataphone and directed to the target dataphone over the link which has previously been established between the two. Second, the CAS signal is detected by the CAS detector in the target dataphone, and an acknowledgement signal sent back to the calling dataphone acknowledging receipt of the CAS signal. The CAS signal alerts the target dataphone that a data transmission is about to occur. Third, upon receipt of the acknowledgment, the information to be transmitted is encoded into an FSK format by the FSK generator in the calling dataphone, and transmitted to the target dataphone over the link which has been previously established. In one implementation, consistent with the Type II, Type III, and ADSI-compatible protocols, transmission between the two units occurs at frequencies within the voice band. In one implementation example, these frequencies range from 500–2500 Hz. In another implementation, these frequencies range from 1000–2200 Hz.

In one implementation, a message type byte is included in the information stream identifying the stream as originating from a calling dataphone in contrast to an SPCS server as per the standard ADSI protocol. This is consistent with the ADSI protocol, which permits manufacturer-specific message types.

Fifth, the FSK signals are received and demodulated by the target dataphone, thus establishing the link between the calling and target dataphones. Moreover, the message type byte is detected, thus signaling the target dataphone that the information has originated from a calling dataphone rather than a SPCS server. At this point, the protocol for exchanging information may deviate from that specified by the ADSI protocol.

In one mode of operation, referred to as the simplex mode of operation, data transmission occurs one way from the calling dataphone to the target dataphone. In this mode of operation, the calling dataphone may continue to transmit data to the target dataphone in accordance with a protocol understood by both parties. In this mode of operation, when the calling dataphone has completed data transfer, the FSK link is broken, and the call between the two dataphones over the telecommunications network is terminated.

In a second mode of operation, referred to as a half duplex mode of operation, data transmission from the calling dataphone to the target dataphone occurs as in the simplex mode of operation, but, after this is completed, the calling dataphone enables its FSK receiver, and the target dataphone then begins transmitting data to the calling dataphone. The two can then alternate data transmission to one another indefinitely, until either unit breaks the link, thus terminating the call.

In a third mode of operation, full duplex transmission occurs.

In a second embodiment, data transmission between the two units occurs independent of the telecommunication network, and over an acoustical channel. In this embodiment, consistent with the Type II, Type III, and ADSI-compatible protocols, information is transmitted between the two units at frequencies within the voice band. In one implementation, these frequencies range from 500–2500 Hz. In another implementation, they range from 1000–2200 Hz. The acoustical channel comprises the speaker/earpiece of the originating dataphone, and extends through the air to the microphone of the destination dataphone. The information is converted to FSK signals by the FSK generator of the originating dataphone. It is then converted to an acoustic signal by the speaker/earpiece of the originating dataphone, and transmitted over the air. The acoustic signal is received by the microphone of the destination dataphone, which converts it back into electrical FSK signals. These electrical signals are then processed as in the first embodiment. Compared to the first embodiment, the two dataphones do not need to be in an off-hook condition to establish the link, although the speaker/earpiece of the originating dataphone and the microphone of the destination dataphone do generally need to be in a line-of-sight relationship.

In a third embodiment, a CPE is any device which is capable of placing calls to other similarly disposed units over a telecommunication network such as the PSTN, which further has a CAS generator and detector, and a FSK generator/detector, and which is configured to communicate FSK-encoded data over a pre-established link with a similarly disposed device. Such devices may include laptops, desk top computers, and palm pilots.

In a fourth embodiment, the calling and target CPEs are each a wireless communication device, such as a mobile handset, which further has a CAS generator and detector, and a FSK generator and detector, and which is configured to communicate FSK-encoded data over a predefined wireless link with a similarly disposed device.

In a fifth embodiment, data stored in a target CPE is remotely accessed by an initiating CPE. In one implementation, the target CPE is a user's home dataphone and the initiating CPE is the user's remote dataphone. The data stored in the target CPE may include caller ID logs, contact lists, email messages and other types of data. The stored data is FSK-encoded by the target CPE and transmitted to the initiating CPE for display and/or storage.

In a sixth embodiment, a user's home or "field" CPE is remotely tested by a technical support center or entity or "support CPE". The support CPE FSK-encodes a message to the field CPE instructing it to enter a self-test mode. The field CPE executes the self-test and FSK-encodes and transmits the results to the support CPE.

In a seventh embodiment, a cordless CPE is in RF communication with a network of RF units that control the active states of home appliances and utilities. A remote CPE, typically a user's cordless dataphone, FSK-encodes and transmits a message to the cordless CPE instructing it to issue an RF command to the network of RF units. The cordless CPE receives the FSK-encoded message and issues an appropriate command via its RF transceiver to one or more of the RF units. In a "two-way" mode of operation, the RF units include an RF transmitter for communicating the results or status to the cordless CPE, and the cordless CPE FSK-encodes and transmits a message containing the results or status to the remote CPE.

In an eighth embodiment, a user CPE is remotely configured or upgraded by a control CPE. In one implementation example, the control CPE is a home-based PC and the user CPE is a dataphone having an associated software interface which is loaded into the PC. The software interface prompts the user to select operating options or configurations, and once complete, the control CPE initiates transmission of the configuration data to the user CPE by sending a CAS to the user CPE. Hence, the user may purchase a dataphone and, using the provided software package, program or configure the phone to her tastes. In another implementation, the control CPE is a manufacturer-based computer or controller. Hence, the user may purchase additional options or request an upgrade from the manufacturer, the user phone may have built-in features that must be enabled by the manufacturer, or the control CPE might be a central database containing telephone profiles that can be transferred to individual phones (user CPEs) to personalize the phones to specific needs or desires.

Objects and advantages of the present invention include any of the foregoing, singly or in combination. Further objects and advantages will be apparent to those of ordinary skill in the art, or will be set forth in the following disclosure.

BRIEF DESCRIPTION OF THE DRAWINGS

The present invention is described with reference to the accompanying drawings. In the drawings, like reference numbers indicate identical or functionally similar elements.

DETAILED DESCRIPTION OF PREFERRED EMBODIMENTS

Background

The following Acronym Definition Table defines the acronyms that are used throughout the following disclosure.

Acronym Definition Table

| Acronym | Definition |
| --- | --- |
| ADSI | Analog Display Services Interface |
| CAS | CPE Alerting Signal |
| CLASS | Custom Local Area Signaling Service |
| CPE | Customer Premises Equipment |
| CPN Message | Calling Party Number Message |
| DTMF | Dual Tone Multi-Frequency |
| FSK | Frequency Shift Keying |
| PSTN | Public Switch Telephone Network |
| Caller ID | Caller Identification |
| SPCS | Stored Program Controlled System (central office switch or server) |

Example Environment

Figure 1:
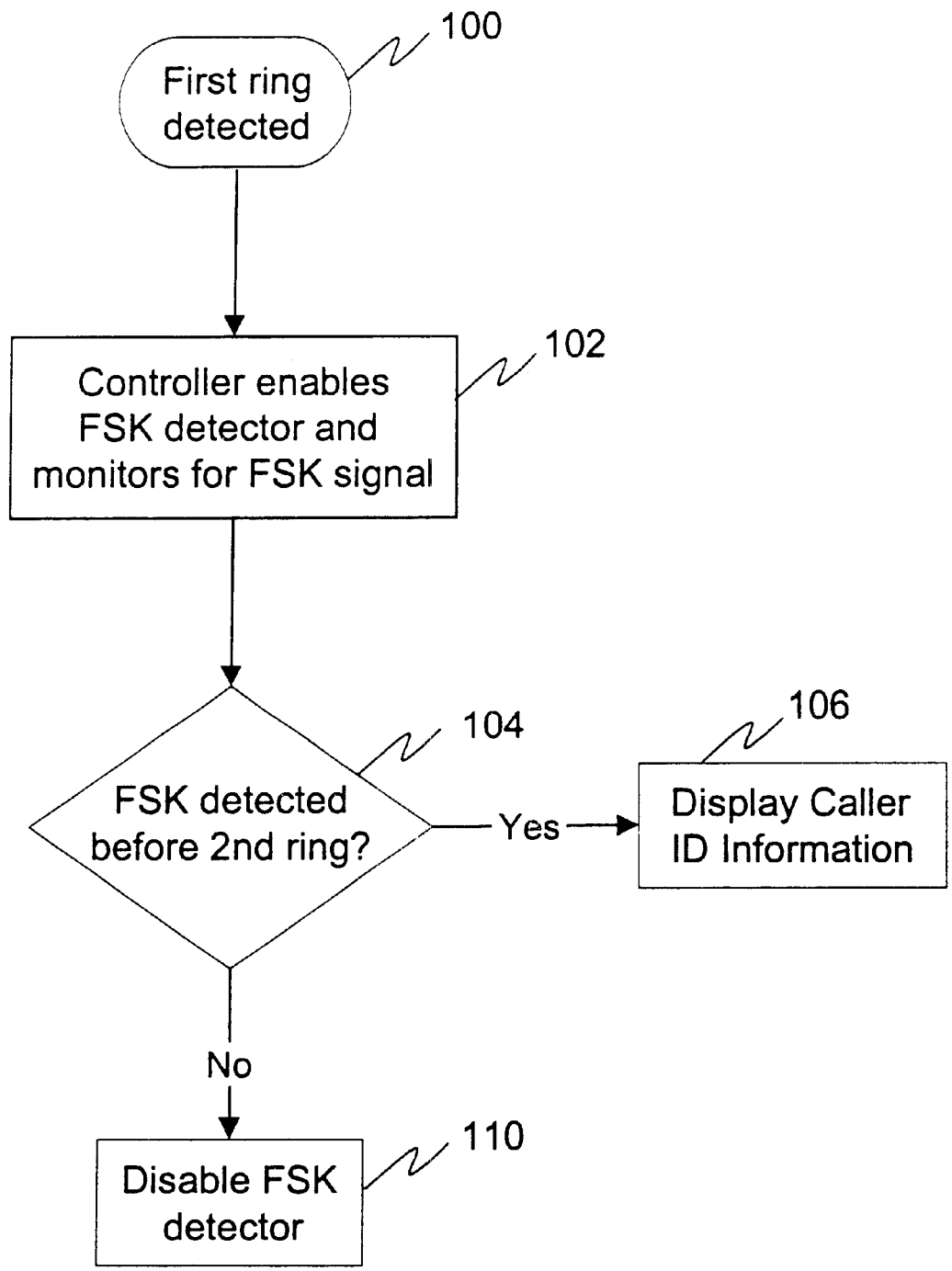
FIG. 1 illustrates a method of operation of a Type I Caller ID CLASS phone.
Figure 2:
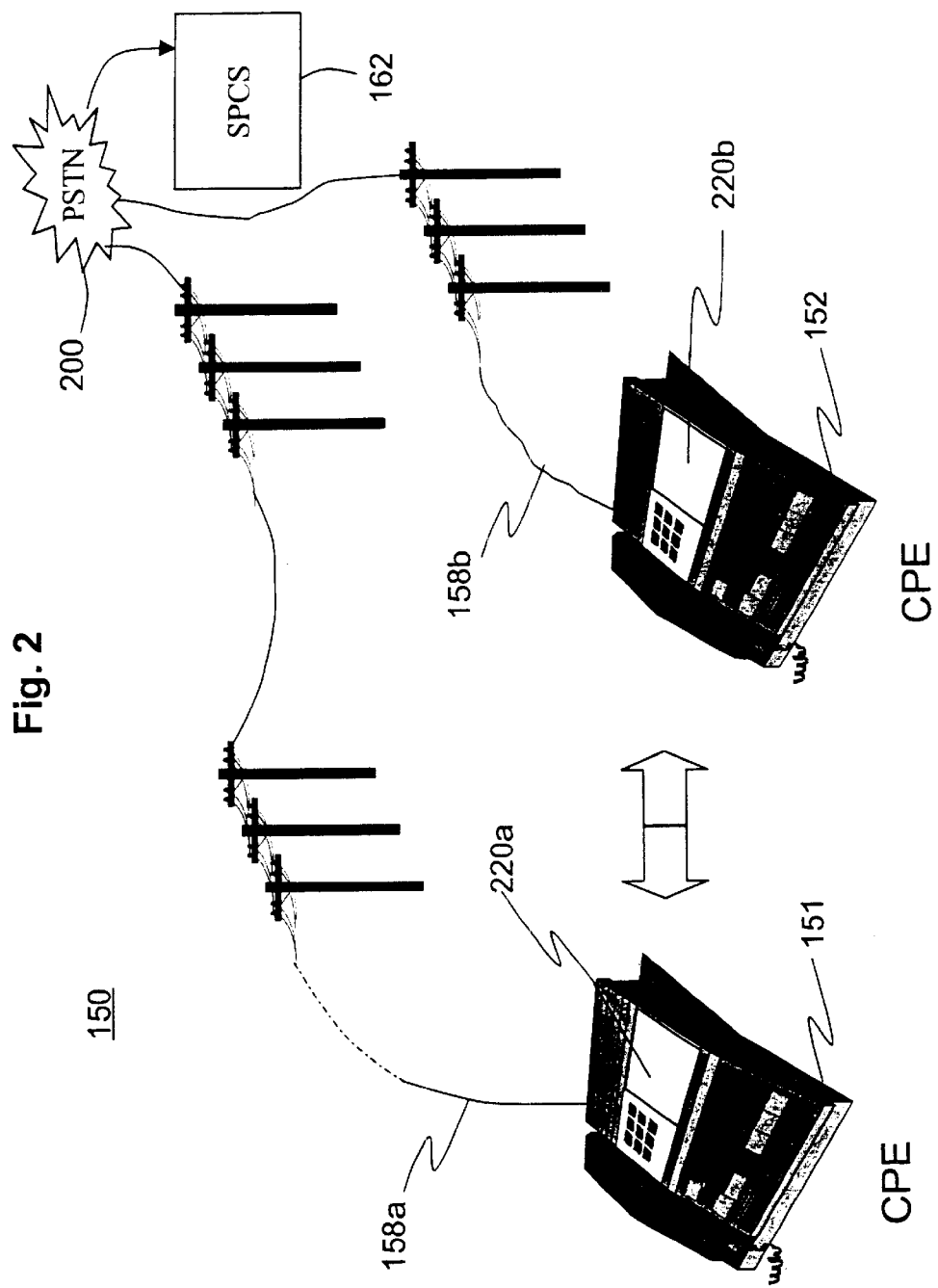
FIG. 2 illustrates an example environment of one embodiment of the subject invention.

As illustrated in FIG. 2, an example environment for the subject invention is a telecommunications network 150 linking two or more CPEs 151, 152. CPE 151 is linked to the PSTN 200 over line 158a, and CPE 152 is linked to the PSTN 200 over lines 158b. Included within the PSTN is an SPCS server, identified with numeral 162. Each of the CPEs 151, 152 is configured with a display 220a, 220b.

Each of the CPEs is configured with a CLASS Caller ID capability in which each unit is configured to receive CLASS Caller ID signals from SPCS server 162, to decode the signals to obtain the underlying information, and display the information on displays 220a, 220b.

Figure 5:
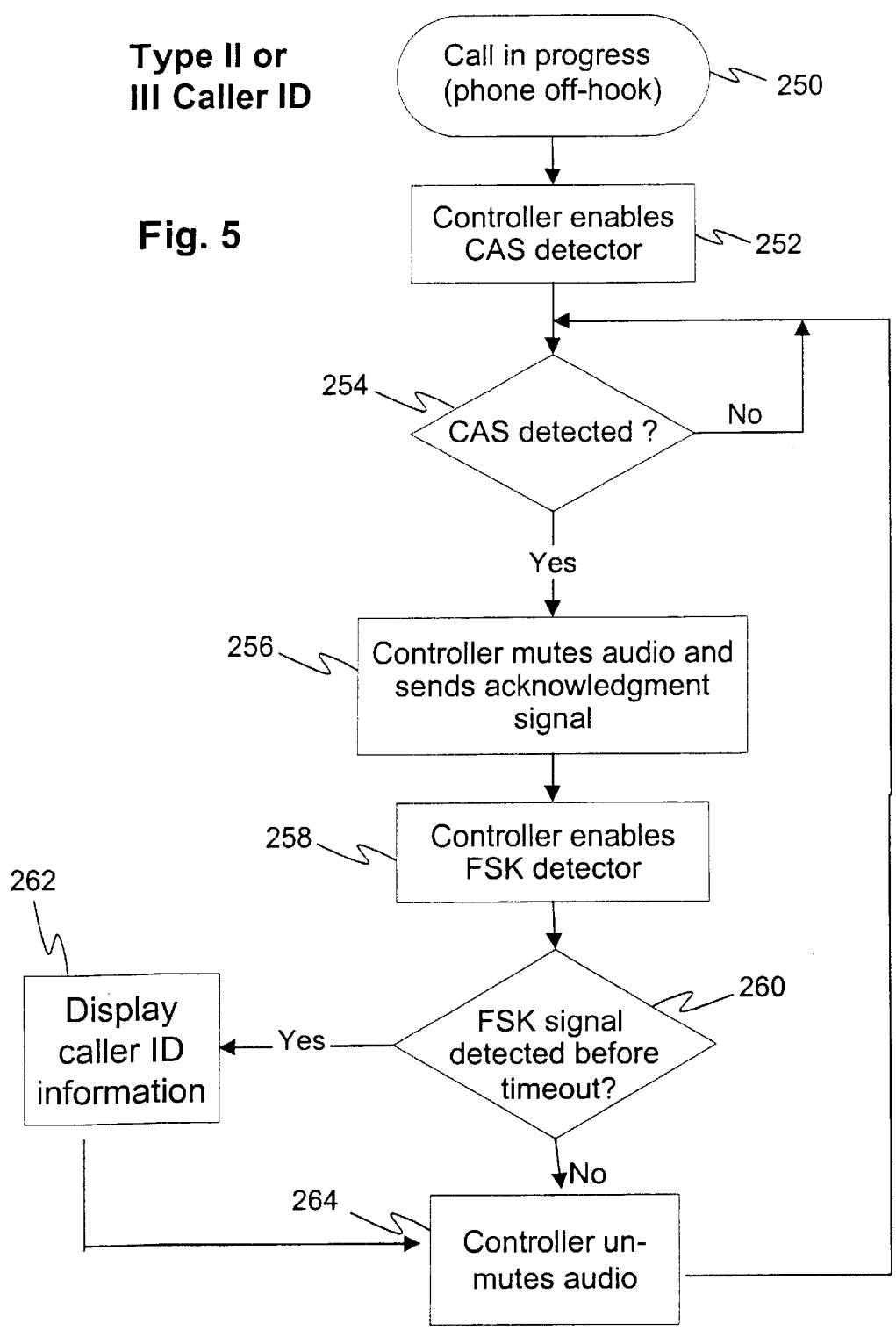
FIG. 5 illustrates a method of operation of a Type II/Type III Caller ID CLASS phone.

In one implementation, each CPE 151, 152 is a Type II or Type III unit, that is, a unit configured with a CAS detector and a FSK receiver which are configured to 1) detect and acknowledge a CAS signal from SPCS server 162; 2) thereafter detect CLASS Caller ID FSK signals originating from the SPCS server 162; and 3) display the caller ID information, all in accordance with the previously discussed Type II and Type III procedures (see FIG. 5 and the related text for a description of the Type II and Type III procedures).

In a second implementation, each CPE 151, 152 is an ADSI-compatible unit, that is, a unit configured with a CAS detector, an FSK receiver, and an FSK generator, which are configured to 1) detect and acknowledge a CAS signal from SPCS server 162; 2) thereafter detect CLASS Caller ID FSK signals originating from SPCS server 162; 3) display the caller ID information, all in accordance with the previously discussed Type III procedures; and 4) exchange information encoded in the form of CLASS FSK signals with SPCS server 162 in accordance with ADSI-interface protocols.

The CPE can be any device configured to provide CLASS caller ID functionality, including a telephone, laptop, palm pilot, handset, and dataphone (to be described in the next section).

First Embodiment

Figure 3:
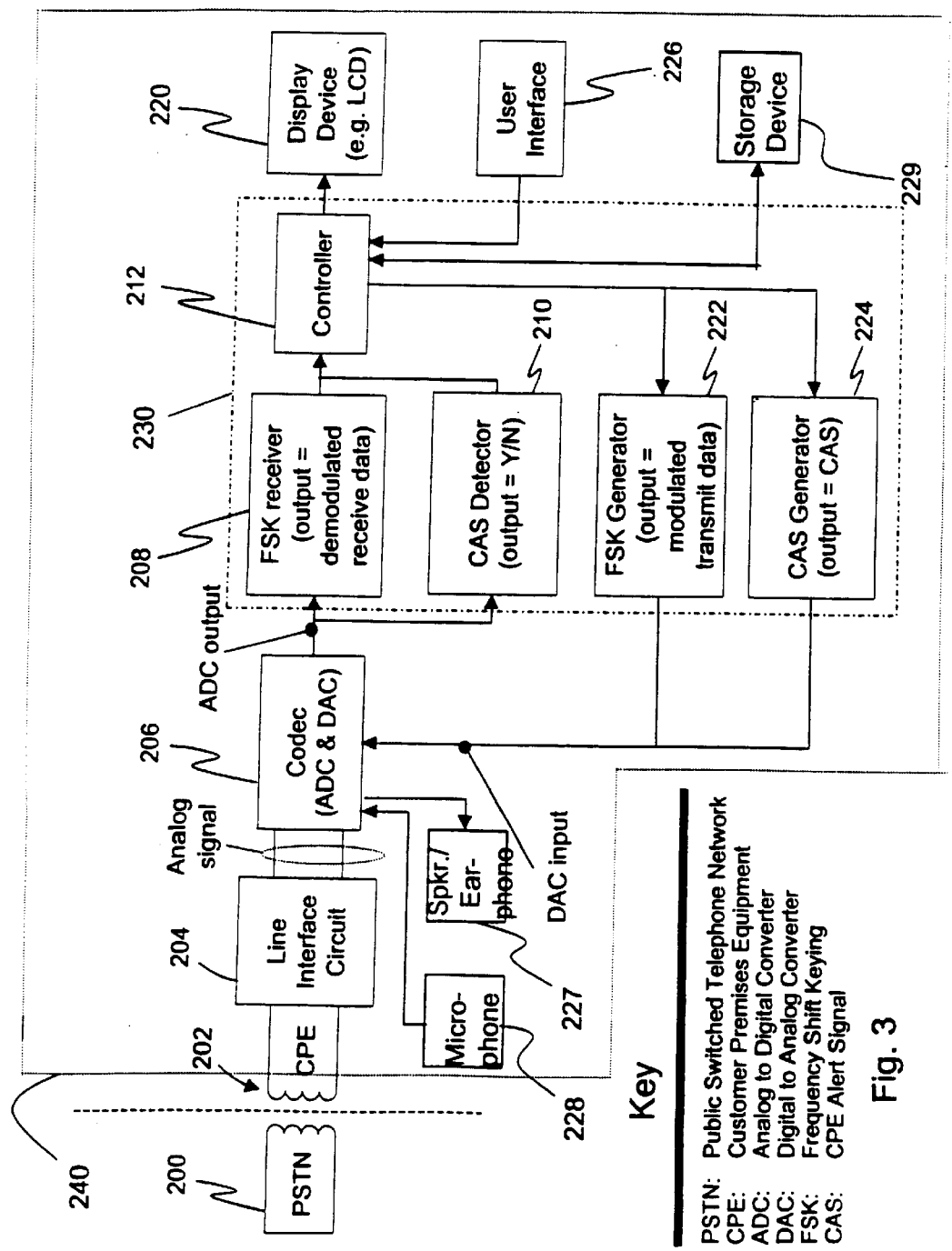
FIG. 3 illustrates a block diagram of a first embodiment of a dataphone of the subject invention.

In accordance with a first embodiment of the subject invention, a CPE is a device known as a dataphone, an embodiment of which is illustrated in FIG. 3. In general, a dataphone is a telephone which is equipped to communicate FSK-encoded data with another dataphone over a telecommunication network such as the PSTN using the pre-existing CLASS Caller ID functionality. As shown, in one embodiment, dataphone 240 comprises line interface circuit 204, CODEC 206, FSK receiver 208, CAS detector 210, FSK generator 222, CAS generator 224, controller 212, display 220, speaker/earphone 227, and microphone 228. Optionally, user interface 226 and storage device 229 are also provided as shown.

The dataphone is configured to provide CLASS caller ID functionality. In one implementation, the dataphone provides Type II functionality; in a second implementation, Type III functionality; in a third implementation, ADSI-compatible functionality, which includes Type III functionality. In addition, the dataphone is configured to provide the voice communication capability of a standard telephone.

CODEC 208 includes both an A/D Converter (ADC) for digitizing and decoding incoming analog signals received from line interface circuit 204, and a D/A converter (DAC) for coding digitized signals received from FSK generator 222 or CAS generator 224, and then putting these signals into analog form.

Figure 7:
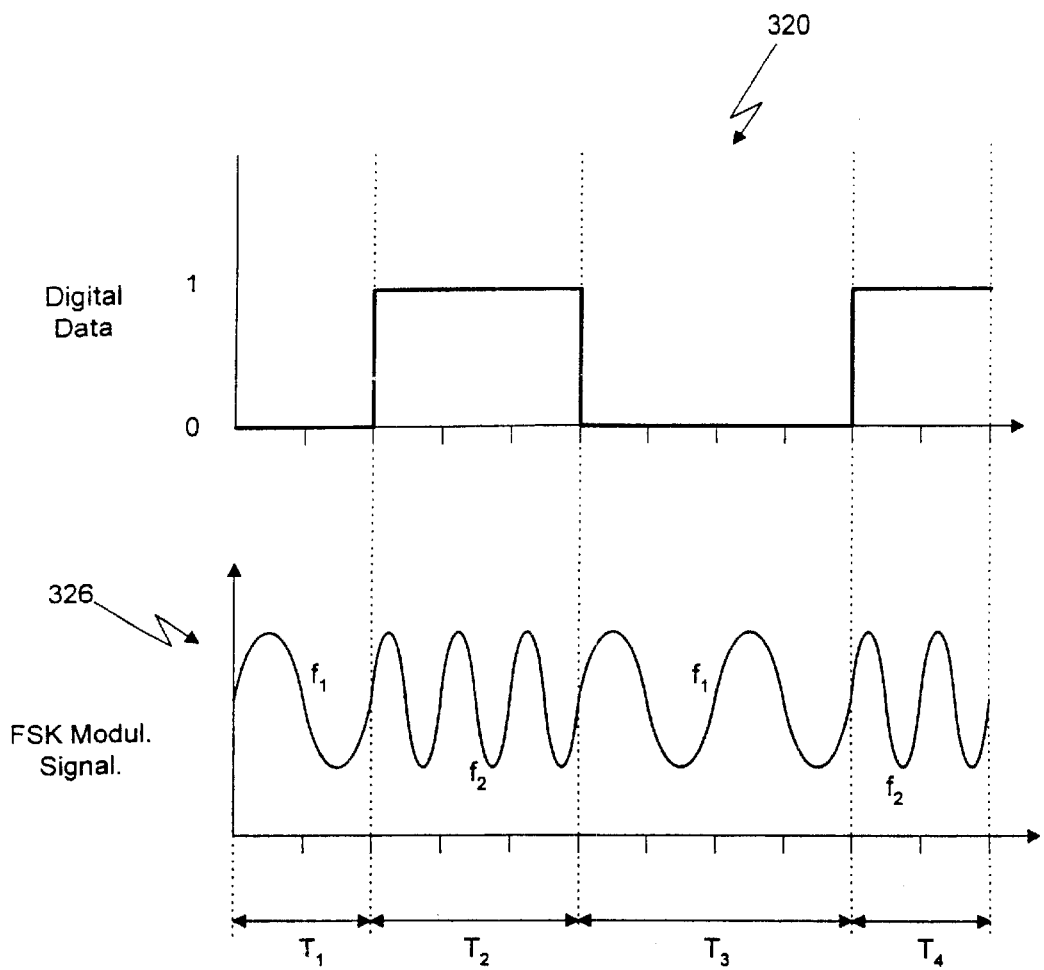
FIG. 7 illustrates an FSK modulated signal.

FSK receiver 208 is configured to receive and demodulate FSK signals. As illustrated in FIG. 7, a binary FSK signal 328 has a frequency dependent on the state of a modulating signal 320. Thus, if modulating signal 320 is a binary '0', the FSK modulated signal has a frequency $f_1$, and if the modulating signal 320 is a binary '1', the FSK modulated signal has a frequency $f_2$ which is different from $f_1$. In the example shown, the frequency $f_2$ is greater than $f_1$.

As shown, in time periods $T_1$ and $T_3$, when the modulating signal is a binary '0', the frequency of modulated signal 326 is $f_1$, while in time periods $T_2$ and $T_4$, when the modulating signal is a binary '1', the frequency of modulated signal 326 is $f_2$.

An M-ary FSK signal is also possible, in which the frequency of the signal is capable of having one of M values, $f_1, f_2, \ldots, f_M$, depending on the state of modulating signal 320, which can take on one of M values. Additional information on FSK modulated signals is available in B. Sklar, "Digital Communications Fundamentals and Applications," Prentice-Hall, 1988, which is hereby fully incorporated by reference herein as though set forth in full. FSK receiver 208 receives a FSK signal and demodulates it to provide the modulating signal.

CAS detector 210 is configured to detect a CAS signal upon being actuated by controller 212. In one implementation, a CAS originating from a SPCS server comprises a dual tone 80 millisecond signal at a power level of –15 dB per tone, and a CAS originating from a CPE is increased to greater than the –15 dB per tone to compensate for the increase in distance which the signal must travel before detection. In one implementation example, the dual tones of the CAS comprise a combination of a first tone at 2130 Hz and a second tone at 2750 Hz.

FSK generator 222 is configured to generate an FSK-modulated signal from a modulating signal provided by controller 212. The FSK-modulated signal is at a frequency which is within the voice band of 300–3400 Hz. Such allows the data communication between two dataphones to occur over the same circuit which is established between the two units after a call is placed from one unit to the other. In one implementation, the frequency of the FSK-encoded transmission is between 500–2500 Hz. In a second implementation, the frequency of the FSK-encoded transmission is between 1000–2200 Hz. In one implementation example, the frequency of transmission is 1200 bps. CAS generator 224 is configured to generate a CAS signal upon being actuated by controller 212.

The display device 220 comprises a LCD display, although in other configurations, it may comprise a CRT display, thin film transistor or plasma technology display, or other suitable display device.

Controller 212 is configured to direct the overall operation of dataphone 240. It can be implemented in a variety of forms, such as a processor, a microprocessor, a microcontroller, a digital signal processor (DSP), or an ASIC. For purposes of this disclosure, a processor is any device configured to perform a series of tasks responsive to discrete instructions stored in a memory accessible by the processor.

User interface 229 is any suitable means for inputting information into the dataphone, such as a keypad, keyboard, mouse, touch-screen, voice-activation means, or the like.

Storage device 229 is any device capable of storing data or instructions, such as RAM, ROM, EEPROM, EPROM, hard or floppy disk, CD-ROM, or the like.

Speaker/earphone 227 is either or both a speaker and an earphone depending on the specific configuration of the dataphone. Both the speaker and the dataphone are configured to convert electrical signals to acoustic signals, typically audible acoustic signals. Microphone 228 is configured to covert acoustic signals, typically those in the audio band, into electrical signals.

Dataphone 240 connects to the PSTN 200 via a standard telephone jack or connector 202. An incoming signal is processed by line interface circuitry 204 and CODEC 206. The output of the CODEC 206 connects to FSK receiver 208, CAS detector 210, and speaker/earphone 227. The outputs of FSK receiver 208 and CAS detector 210 in turn are connected to controller 212. After processing these outputs, controller 212 provides the processing outputs to display 220, or storage device 229. Display 220 is configured to display the information obtained from the controller. Storage device 229 is configured to store this information.

Speaker/earphone 227 is configured to audibly play the audio information received from CODEC 206.

Controller 212 also connects to user interface 226, FSK generator 222 and CAS generator. The outputs of the FSK generator 222 and CAS generator 224 are connected to CODEC 206, as is the output of microphone 228.

The output of CODEC 206 in turn connects to line interface circuit 204, which in turn connects to PSTN 200 through jack 202.

In one implementation, FSK receiver 208, CAS detector 210, FSK generator 222, CAS generator 224, and controller 212 are implemented on a single chip 230. In one implementation example, each of these components is implemented through suitable software executing on a DSP. In another implementation example, each is implemented through suitable discrete hardware components.

Operation

Figure 4:
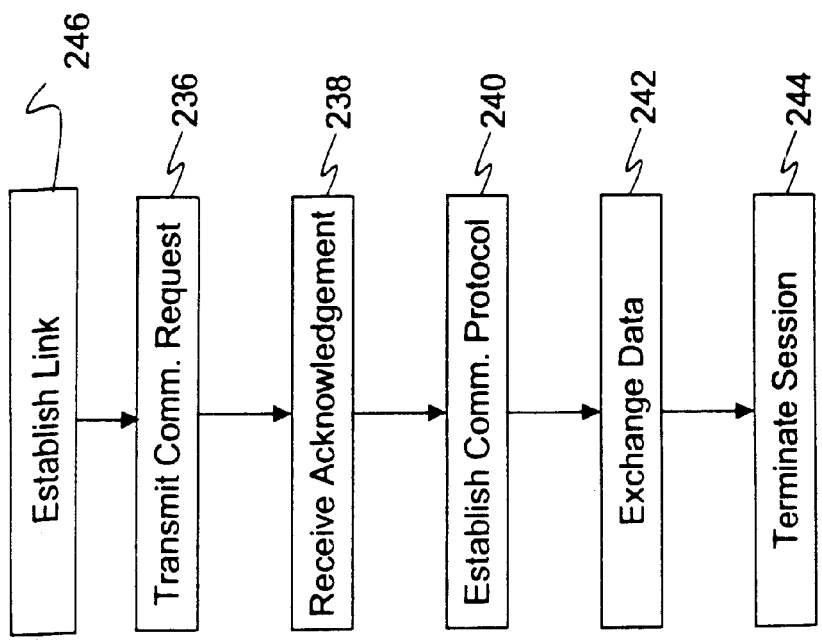
FIG. 4 illustrates an operational flow diagram of one embodiment of the subject invention.

FIG. 4 illustrates a first embodiment of a method of operation of the subject invention. At step 246, a link is established between two dataphones over a telecommunications network such as the PSTN. In one implementation, this link is established when a calling dataphone initiates a call to a target dataphone over a circuit-switching network such as the PSTN, the target dataphone receives the call, and a circuit established between the two dataphones. In one implementation example, the target dataphone receives the call by placing itself in an off-hook condition. In one example, the circuit established between the two dataphone comprises a voice channel, capable of transmitting frequencies with the 300–3400 Hz voice band.

At a step 236, one of the linked dataphones transmits a request for data communication to the other dataphone, referred to herein as the target dataphone, over the link which has been established between the two units in step 246.

At a step 238, the target dataphone, upon receiving the request for data communication from the initiating dataphone, provides an acknowledgment thereof to the initiating dataphone.

At a step 240, a communications protocol is established between the two units. In one implementation, the protocol deviated from the ADSI-compatible protocol. Thereafter, at a step 242, data is exchanged between the two dataphones over the link which has previously been established between the two in step 246. In one implementation, the data is transmitted between the two in the form of FSK-encoded signals at frequencies within the voice band.

At a step 244 the communication session is terminated. In one implementation, either dataphone may terminate the communication session.

Figure 6A:
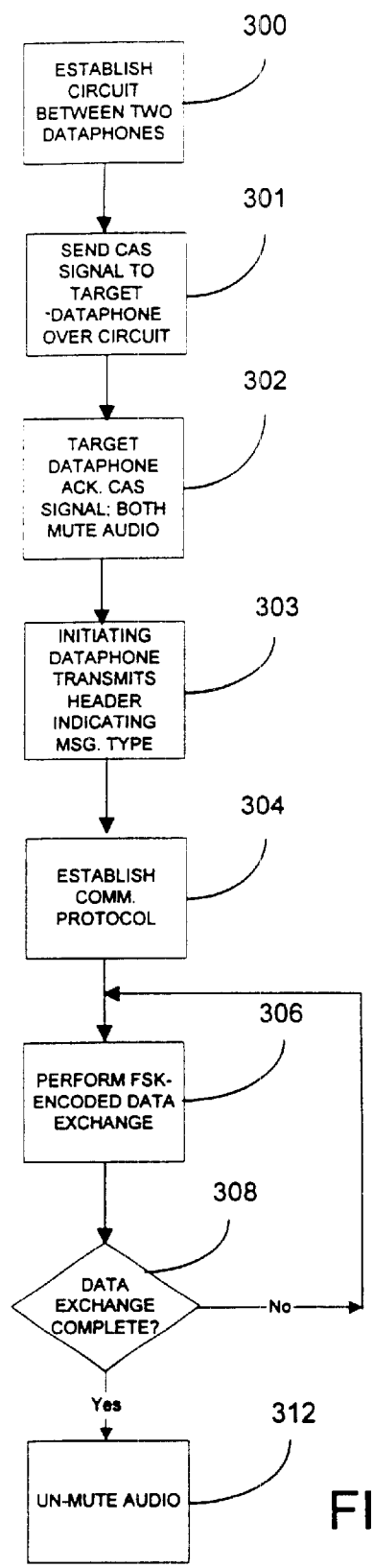
FIGS. 6A–6B illustrate an operational flow diagram of a second embodiment of the subject invention.

FIG. 6A illustrates a second embodiment of a method of operation of the subject invention. In step 300, a circuit is established between two dataphones over a circuit-switching telecommunications network such as the PSTN. In one implementation, the circuit comprises a channel configured to transmit frequencies within the voice band. In one implementation example, the circuit is established when a calling dataphone calls a target dataphone, and the target dataphone receives the call, that is, places itself in an off-hook condition.

In step 301, one of the two linked dataphones desiring to intitate data communication with the other of the two dataphones, sends a CAS signal to the other dataphone over the circuit which has been established between the two in step 300. The initiating dataphone can be either the calling dataphone or the target dataphone referred to above in relation to step 300.

In step 302, the receiving dataphone, upon receiving the CAS signal, sends an acknowledgement to the initiating dataphone over the circuit which has been established between the two. In addition, both units mute the transmission of audio or voice information over the circuit which has been established between the two units. The object is to avoid interference with the data communication which is about to occur. In the case in which the receiving dataphone supports CLASS Type II Caller ID functionality, the acknowledgement signal comprises a DTMF 'D' signal; in the case in which the receiving dataphone supports CLASS Type III Caller ID or ADSI-compatible functionality, the acknowledgement signal is a DTMF 'A' signal.

In step 303, the initiating dataphone transmits header information to the receiving dataphone in the form of FSKO-encoded signals. The FSK-encoded signals are transmitted over the circuit which has been previously established between the two units in step 300. Included in the header is an indicator indicating that the source of the transmission is a dataphone in contrast to a SPCS server.

In step 304, a communications protocol is established between the two units. In one implementation, the protocol can and typically does deviate from the ADSI-compatible protocol. In one implementation example, the protocol which is agreed upon is a simplex mode of operation; in a second implementation example, it is a half-duplex mode of operation.

In step 306, data is exchanged between the two units over the circuit which has been established in step 300. The data which is exchanged is in the form of FSK-encoded signals.

In decision block 308, the process loops back to step 306 while data exchange between the two units is ongoing, and jumps to step 312 when data exchange between the two is complete. In step 312, each units unmutes audio transmission and reception to allow voice communication to occur over the circuit.

Figure 6B:
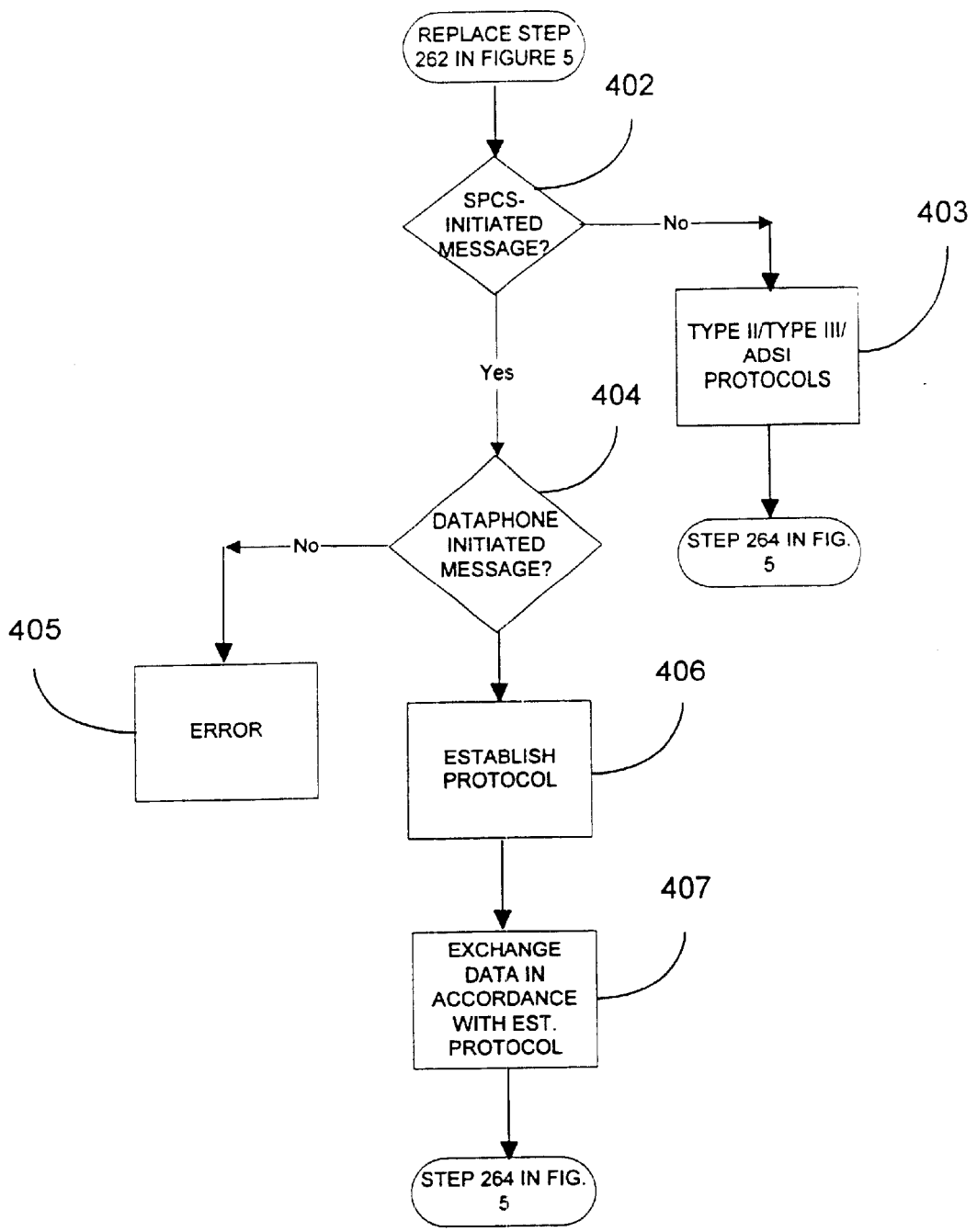

A method of operation of a called dataphone in accordance with the subject invention comprises the method of FIG. 5, with step 262 in FIG. 5 replaced with the steps illustrated in FIG. 6B.

With reference to FIG. 5, as indicated by identifying numeral 250, this process only occurs once a call is in progress, that is, after a voice channel has been established between two dataphones over a telecommunications network such as the PSTN. In one implementation, this channel is established after the called dataphone has been placed in an off-hook condition, either by a user answering a call, or automatically, by the unit itself.

If the dataphone is off-hook, the operation progresses to a step 252 wherein the controller 212 of the receiving dataphone enables the CAS detector 210 thereof. The CAS detector 212 monitors the PSTN interface for CAS signals. In one implementation, the CAS detector remains active during the entire off-hook period.

At step 254, if a CAS signal is not detected, the operation loops and continues to monitor for a CAS signal.

If, at step 254, CAS detector 210 detects a CAS signal, the operation progresses to a step 256 in which the controller 212 mutes the audio path to and from the dataphone. More specifically, controller 212 mutes the speaker/earphone 227 and the microphone 228 to prevent voice communication from being transmitted over the link which has been previously established with the calling dataphone. In addition, in step 256, the controller 212 sends an acknowledgement signal to the calling dataphone. In one implementation, in which the receiving dataphone supports CLASS Type II Caller ID functionality, the acknowledgment signal is a DTMF 'D' signal; in a second implementation, in which the receiving dataphone supports CLASS Type III caller ID functionality, or supports an ADSI-compatible interface, the acknowledgement signal is a DTMF 'A' signal.

Next, at a step 258, the controller 212 enables the FSK detector 208 in anticipation of the reception of FSK-encoded data. At a step 260, the operation loops and continues to monitor for incoming FSK-encoded data. If the FSK detector 208 does not receive the FSK-encoded data within a predetermined time-out period, the operation progresses to a step 264, in which the controller 212 un-mutes the audio path within the dataphone to permit voice communication over the link which has been established between the two units.

If, at step 260, the FSK detector 208 detects incoming FSK-encoded data within the prescribed timeout period, the steps illustrated in FIG. 6B are performed.

In step 402, the controller 212 analyzes the header of the FSK-encoded data stream. Included therein is an indicator indicating the origin of the data stream, whether from a SPCS server or a dataphone. In one configuration, the indicator is a message type (MT) byte which indicates the source of the FSK-encoded data. Such is consistent with the standard ADSI protocol, which allows for manufacturer specific message types.

In step 402, if the indicator indicates that the data stream originated from a SPCS server, then step 403 is performed. In step 403, the pre-existing Type II and Type III caller ID or ADSII-compatible protocols are performed depending on whether the receiving dataphone supports CLASS caller ID Type II functionality, CLASS caller ID Type III functionality, or ADSI-compatible functionality. When this has been accomplished, a jump is made to step 264 in FIG. 5.

In step 402, if the message is not SPCS-initiated, a jump is made to step 404. In step 404, a determination is made whether the message originated from a dataphone. If not, step 405 is performed, and an error condition indicated. If so, step 406 is performed.

In step 406, a communications protocol is established between the two dataphones. In one configuration, the protocol may deviate from the ADSI-compatible protocol. In one implementation, the steps involves selecting a transmission mode from a plurality of predetermined transmission modes, such as, for example, simplex, half duplex, and full duplex modes of operation. According to the simplex mode of operation, only the initiating dataphone transmits data, and the communication session is terminated after the data has been exchanged with the receiving dataphone. According to the half-duplex mode of operation, the initiating and receiving dataphones alternately but not simultaneously transmit data to one another during a communication session. In a full duplex mode of operation, the initiating and receiving dataphones transmit data to one another simultaneously during a communication session.

In an example implementation of asynchronous data transfer using FSK signals, the center carrier frequency of 1,170 Hz is shifted to 1,270 Hz for a digital '1' value and to 1,070 Hz for a digital '0' value. This example implementation frequency selection is available for simplex and half-duplex transmission.

Figure 10:
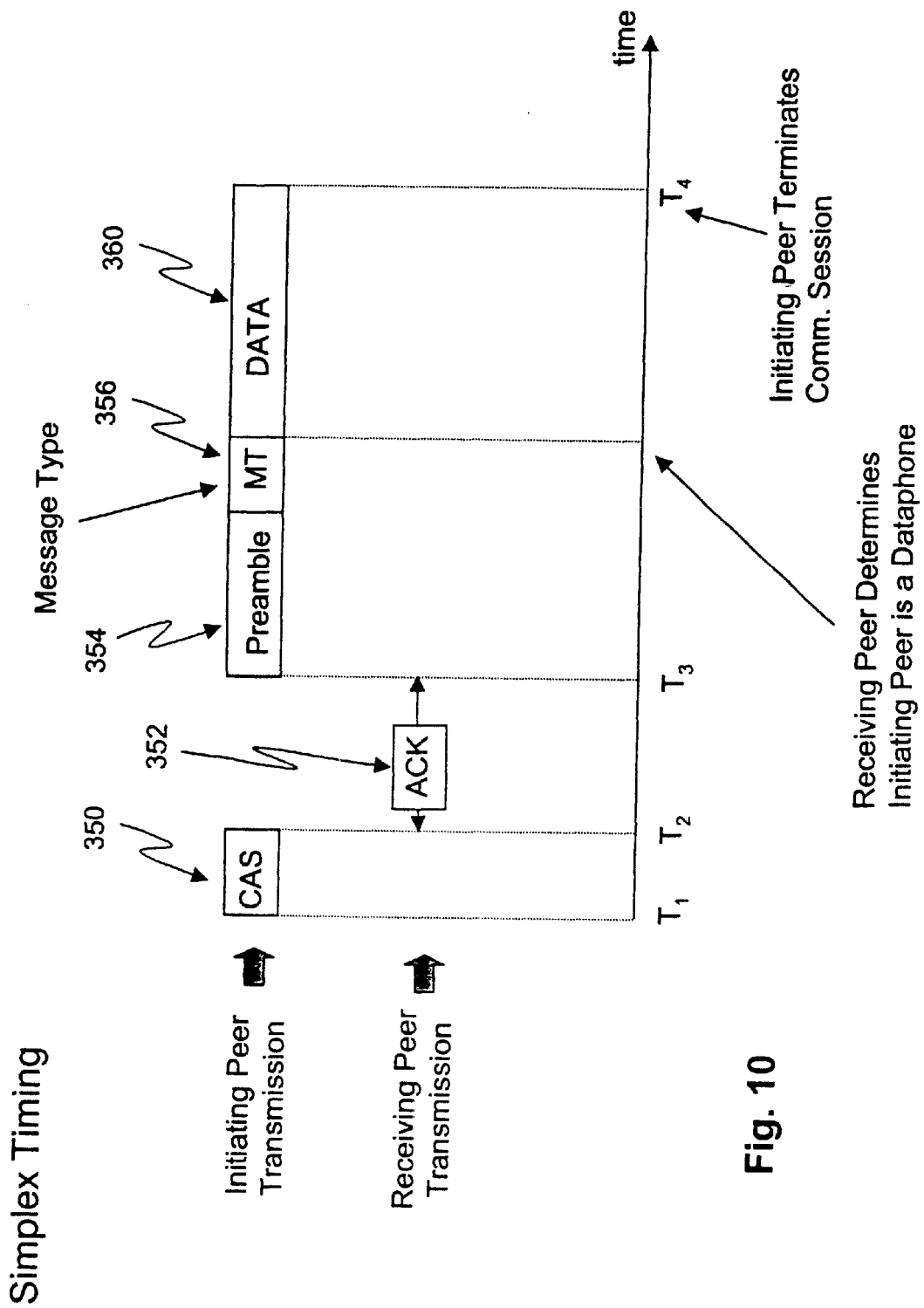
FIG. 10 illustrates an exemplary timing diagram for simplex data transmission in accordance with the subject invention.

FIG. 10 illustrates an exemplary timing diagram consistent with a simplex mode of operation. At a time $T_1$, the initiating peer transmits a CAS signal 350 receiving dataphone on a channel previously established between the two. This indicates to the receiving peer that another device on the network is requesting a data communication session with it.

Next, at a time $T_2$, the receiving peer acknowledges the request for a data communication session using a predetermined acknowledgment signal 352. Thereafter, at a time $T_3$, the initiating peer transmits a header, which in one configuration comprises a preamble 354 followed by a MT byte 356 indicating that the data stream is originating with a dataphone or other CPE in contrast to a SPCS server. This is followed by the FSK-encoded data 360. In one implementation, the MT byte also communicates additional information to the receiving peer, such as the type of CPE which is initiating the session, and the protocol for data exchange which will be employed. In one configuration, the MT byte indicates whether a simple, half-duplex, or full-duplex mode of operation will be employed. Upon receipt of the header, the receiving peer determines that the data is originating with a peer CPE, an receives the FSK-encoded data. When this has been accomplished, the session terminates at time $T_4$.

Figure 11:
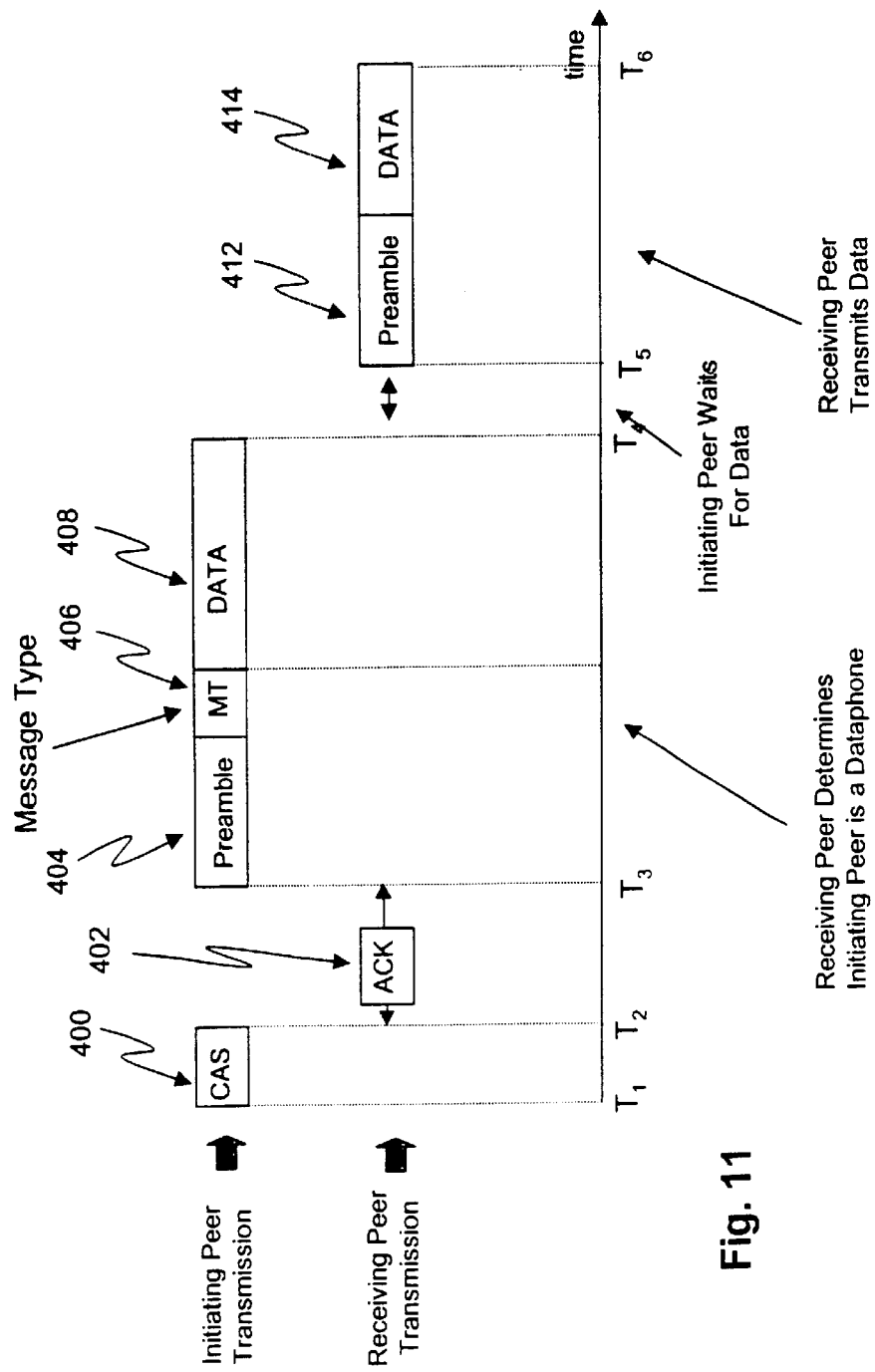
FIG. 11 illustrates an exemplary timing diagram for half-duplex data transmission in accordance with the subject invention.

FIG. 11 illustrates an exemplary timing diagram consistent with a half-duplex mode of operation. At a time $T_1$, the initiating peer transmits a CAS signal 400 to the receiving peer on the channel which has been previously established between the two. This indicates to the receiving peer that a device on the network is requesting a data communication session with it. At time $T_2$, the receiving peer responds with an acknowledgment signal 402. At time $T_3$, the initiating peer responds with a data stream comprising a preamble 404, a MT byte 408, and data 408. Again, the MT byte indicates to the receiving peer that the data stream originates from a peer dataphone or other CPE in contrast to a SPCS server. Iin addition, it optionally indicates the type of CPE which is originating the data, and the communication protocol that will govern the session. In one configuration, it indicates that the communication mode is half-duplex.

Upon completion of data transmission at time $T_4$, control of the channel passes to the receiving peer which, after a short wait period, that is, at time $T_5$, initiates data transmission with the initiating peer. Consequently, beginning at time $T_5$, the receiving peer transmits to the initiating peer a data stream comprising preamble 412 and data 414. At time $T_6$, this step is completed. At this point, the data communication session may terminate, or control of the channel may alternates back and forth between the initiating and receiving peers until the data communication session has been completed.

For full-duplex transmission, the FSK modulation is accomplished by dividing the available bandwidth into bands. A lower frequency band carries data in one direction and an upper frequency band carries data in another direction. The lower band center frequency in this example embodiment is 1,170 Hz. The lower band frequency is shifted to 1,270 Hz for a digital '1' and to 1,070 Hz for a digital '0'. The upper band center frequency is 2,125 Hz. The upper band frequency is shifted to 2,225 Hz for a digital '1' and to 2,025 Hz for a digital '0'.

Next, in step 407, FSK-encoded data is exchanged between the initiating and receiving dataphones in accordance with the protocol established in step 406.

When data exchange between the two units has been completed, the operation jumps to step 264 in FIG. 5. In step 264, the audio path in the dataphone is unmuted, and voice communication allowed to continue or proceed over the channel which was previously established between the two units.

Second Embodiment

In a second embodiment, data transmission between the two units occurs independent of the telecommunication network, and over an acoustical channel. In this embodiment, consistent with the Type II, Type III, and ADSI-compatible protocols, information is transmitted between the two units at frequencies within the voice band. In one implementation, these frequencies range from 500–2500 Hz. In another implementation, they range from 1000–2200 Hz. The acoustical channel comprises the speaker/earpiece of the originating dataphone, and extends through the air to the microphone of the destination dataphone. The information is converted to FSK signals by the FSK generator of the originating dataphone. It is then converted to an acoustic signal by the speaker/earpiece of the originating dataphone, and transmitted over the air. The acoustic signal is received by the microphone of the destination dataphone, which converts it back into electrical FSK signals. These electrical signals are then processed as in the first embodiment. Compared to the first embodiment, neither of the two dataphones need to be in an off-hook condition to establish the link, although the speaker/earpiece of the originating dataphone and the microphone of the destination dataphone do generally need to be in a line-of-sight relationship.

Third Embodiment

Figure 8:
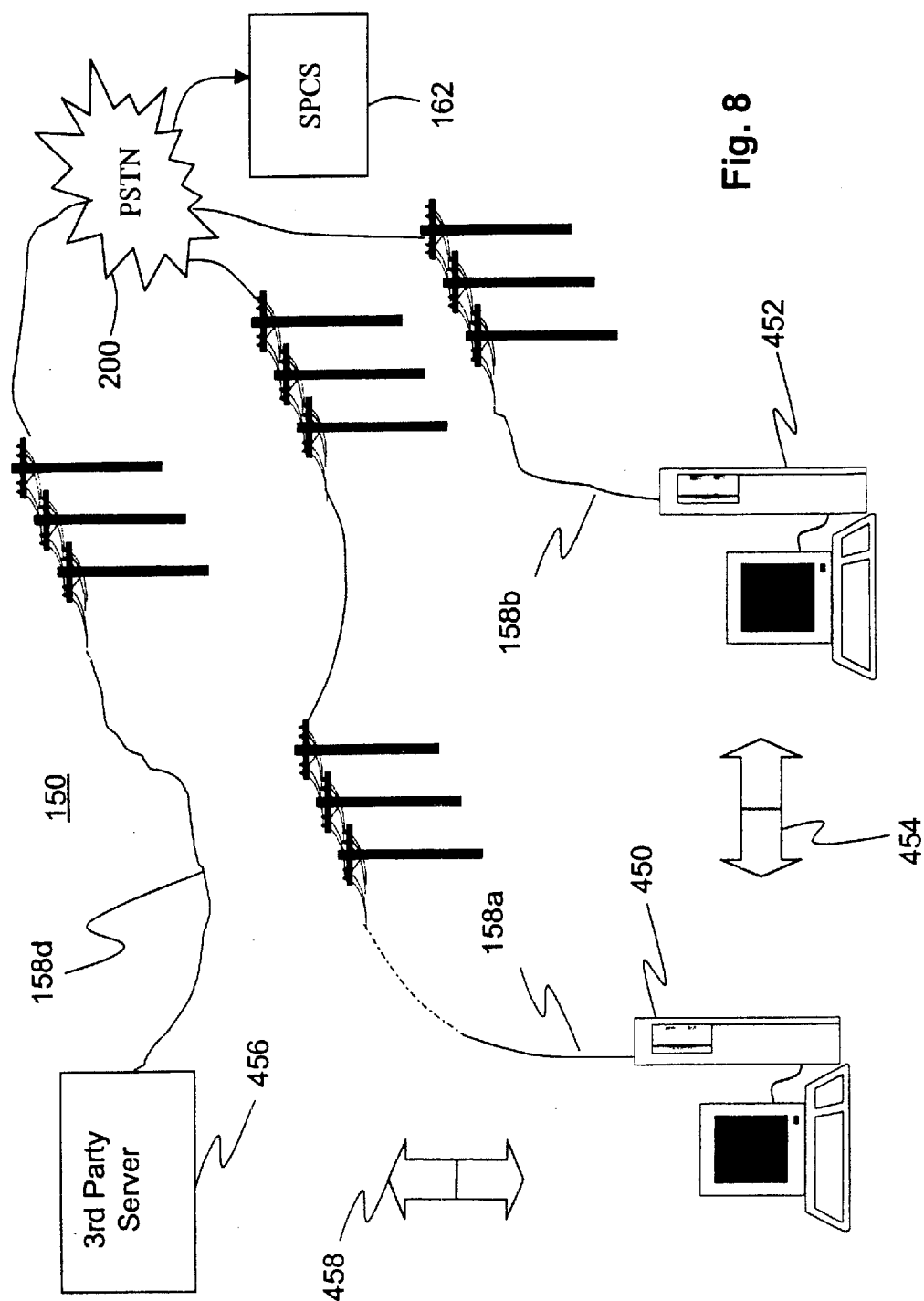
FIG. 8 illustrates a third embodiment of the subject invention.

In a third embodiment, a CPE is any device which is capable of placing calls to other similarly disposed units over a telecommunication network such as the PSTN, which further has a CAS generator and detector, and a FSK generator/detector, and which is configured to communicate FSK-encoded data over a pre-established link with a similarly disposed device. Such devices may include laptops, desk top computers, and palm pilots. FIG. 8 illustrates an example of the third embodiment in which, compared to FIG. 2, like elements are referenced with like reference numeral. As illustrated in FIG. 8, a telecommunications network 400 links two or more CPEs 450, 452, each of which is a personal computer. CPE 450 is linked to the PSTN 200 over line 158a, and CPE 452 is linked to the PSTN 200 over line 158b. Included within the PSTN is an SPCS server, identified with numeral 162.

Each of the CPEs 450, 452 is configured with a CLASS Caller ID capability in which each unit is configured to receive CLASS Caller ID signals from SPCS server 162, to decode the signals to obtain the underlying information, and display the information on displays within each device.

In one implementation, each CPE 450, 452 is a Type II or Type III unit, that is, a unit configured with a CAS detector and a FSK receiver which are configured to 1) detect and acknowledge a CAS signal from SPCS server 162; 2) thereafter detect CLASS Caller ID FSK signals originating from the SPCS server 162; and 3) display the caller ID information, all in accordance with the previously discussed Type II and Type III procedures (see FIG. 5 and the related text for a description of the Type II and Type III procedures).

In a second implementation, each CPE 450, 452 is an ADSI-compatible unit, that is, a unit configured with a CAS detector, an FSK receiver, and an FSK generator, which are configured to 1) detect and acknowledge a CAS signal from SPCS server 162; 2) thereafter detect CLASS Caller ID FSK signals originating from SPCS server 162; 3) display the caller ID information, all in accordance with the previously discussed Type III procedures; and 4) exchange information encoded in the form of CLASS FSK signals with SPCS server 162 in accordance with ADSI-interface protocols.

In addition, the CPEs 450, 452 are configured to communicate FSK-encoded to one another in accordance with the subject invention, as indicated by the bi-directional arrow identified with numeral 454.

Also shown in FIG. 8 is a 3$^{rd}$ party server 456, which is linked to PSTN 200 by means of line 158d. The 3$^{rd}$ party server 456 is configured to provide one or more services to CPEs 450, 452, including, for example, computer hardware or software diagnostic services, weather information, stock market information, news information, Internet security codes, sports reports, business information such as hours, prices, store locations, or other similar data.

In one configuration, the 3$^{rd}$ party server also includes a CAS detector, CAS generator, FSK detector, and FSK generator, and is configured to communicate FSK-encoded data with either of CPEs 450, 452 in accordance with the principles of the subject invention.

Fourth Embodiment

In a fourth embodiment, the calling and target CPEs are each a wireless communication device, such as a mobile handset, which further has a CAS generator and detector, and a FSK generator and detector, and which is configured to communicate FSK-encoded data over a predefined wireless link with a similarly disposed device.

Figure 9:
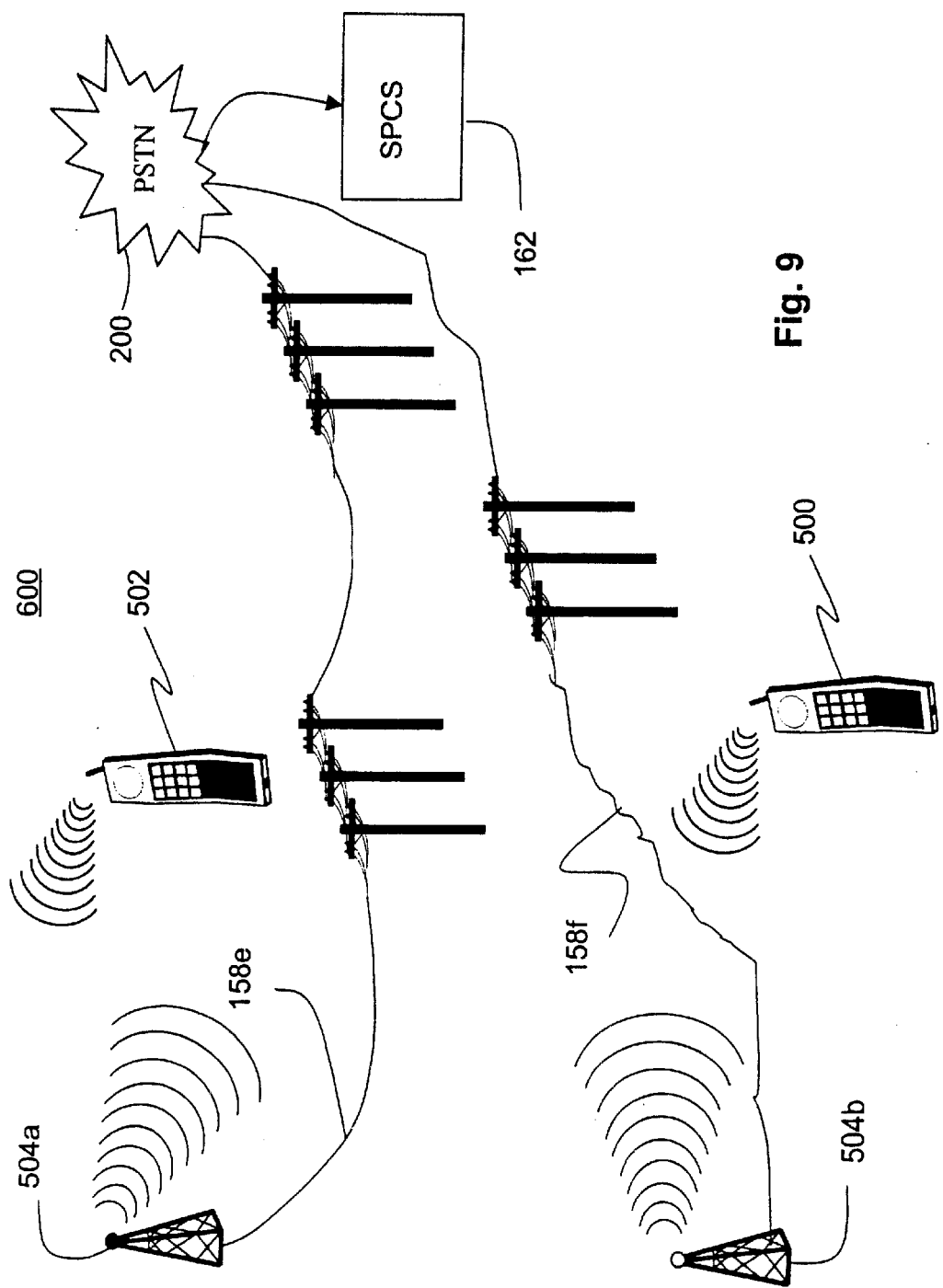
FIG. 9 illustrates a fourth embodiment of the subject invention.

FIG. 9 illustrates an example implementation of the fourth embodiment. In relation to FIG. 2, like elements in FIG. 9 are referenced with like identifying numerals.

As illustrated in FIG. 9, a telecommunications network 600 links two or more CPEs 500, 502, each of which is a mobile wireless communication handset. CPE 500 is linked to the PSTN 200 by means of a wireless interface between CPE 500 and base station 504b, and line 158f linking base station 504b to the PSTN 200. CPE 502 is linked to the PSTN 200 by means of a wireless communications interface between CPE 502 and base station 504a, and line 158e linking the base station 504a with the PSTN 200. Included within the PSTN is an SPCS server, identified with numeral 162.

Each of the CPEs 500, 502 is configured with a CLASS Caller ID capability in which each unit is configured to receive CLASS Caller ID signals from SPCS server 162, to decode the signals to obtain the underlying information, and display the information on displays within each device.

In one implementation, each CPE 500, 502 is a Type II or Type III unit, that is, a unit configured with a CAS detector and a FSK receiver which are configured to 1) detect and acknowledge a CAS signal from SPCS server 162; 2) thereafter detect CLASS Caller ID FSK signals originating from the SPCS server 162; and 3) display the caller ID information, all in accordance with the previously discussed Type II and Type III procedures (see FIG. 5 and the related text for a description of the Type II and Type III procedures).

In a second implementation, each CPE 500, 502 is an ADSI-compatible unit, that is, a unit configured with a CAS detector, an FSK receiver, and an FSK generator, which are configured to 1) detect and acknowledge a CAS signal from SPCS server 162; 2) thereafter detect CLASS Caller ID FSK signals originating from SPCS server 162; 3) display the caller ID information, all in accordance with the previously discussed Type III procedures; and 4) exchange information encoded in the form of CLASS FSK signals with SPCS server 162 in accordance with ADSI-interface protocols.

In addition, the CPEs 500, 502 are configured to communicate FSK-encoded data to one another in accordance with the subject invention.

Applications

A number of new applications are made possible by means of the subject invention. One example is the use of the subject invention to remotely access a telephone from another telephone to obtain a listing of those who have called the remote telephone within a prescribed time period. A second example is the use of the subject invention to remotely access a telephone from a laptop or other computer in order to activate dormant functionality in the remote telephone through the setting of appropriate bits. A third example is the use of the subject invention to remotely access a computer from another computer in order to run diagnostics and the like on the remote computer.

Fifth Embodiment: Remote Access of Data Stored in a CPE

Figure 12:
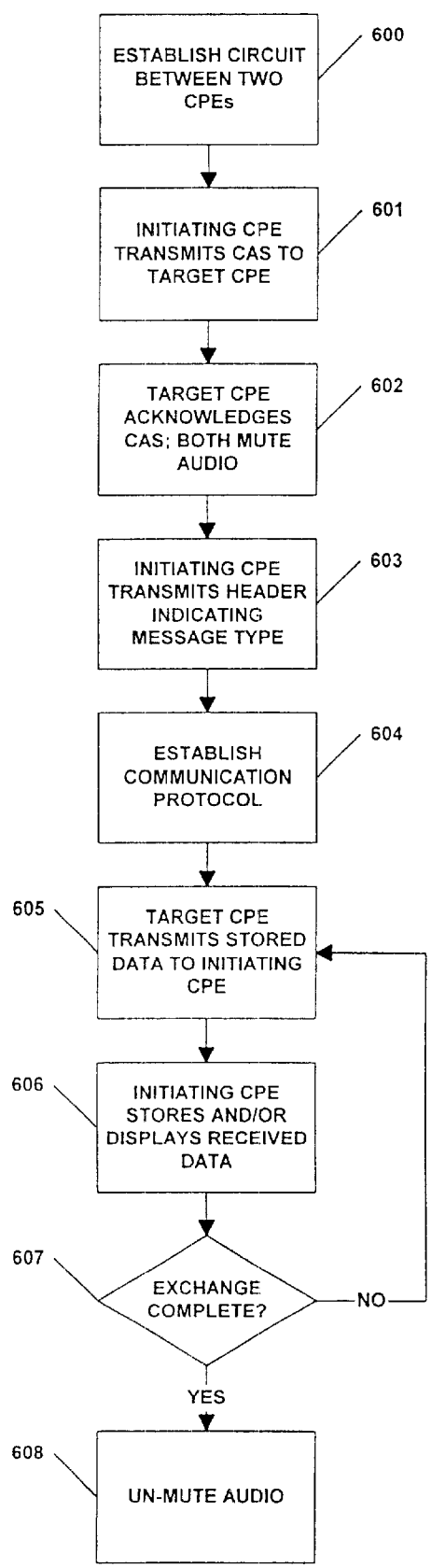
FIG. 12 illustrates a method of operation of a fifth embodiment of the subject invention wherein data stored in one CPE is remotely accessed by another CPE.

FIG. 12 illustrates a fifth embodiment of the subject invention wherein data stored in a target CPE is remotely accessed by an initiating CPE. The CPEs may be any devices configured to provide CLASS caller ID functionality, including wired or wireless dataphones, telephones, laptops, palm pilots and handsets. The dataphone described previously with reference to FIG. 3 is a suitable example. At a minimum, the initiating CPE must have a CAS generator, and an FSK receiver and generator; the target CPE must have a CAS detector, and an FSK receiver and generator.

The data stored in the target CPE may be any type of data that the CPE is capable of storing. In one implementation, the stored data is a log of incoming calling numbers and other data such as the time of the call and name of the caller. CPEs configured for CLASS caller ID functionality are required to maintain such a log. In another implementation, the stored data is an address/contact listing maintained by the target CPE. In another implementation, one in which the target CPE is capable of receiving and storing email messages, the stored data is the received email messages.

In step 600, a circuit is established between two CPEs over a circuit-switching telecommunications network such as the PSTN. In one implementation, the circuit comprises a channel configured to transmit frequencies within the voice band. In one implementation example, the circuit is established when an initiating CPE calls a target CPE, and the target CPE receives the call, that is, places itself in an off-hook condition. Typically, the initiating CPE would be a remote device and the target CPE would be a dataphone or other CPE at the user's home or office, for example. Any two CPEs having CLASS caller ID functionality, however, could be utilized.

In step 601, the initiating CPE sends a CAS to the target CPE over the circuit that has been established between the two in step 600. This may be accomplished in a number of ways, either manually or automatically. In one implementation, the initiating CPE includes a menu or keyboard system that provides options for downloading data from another CPE. A menu entry might state, for example, "Download Caller Log from Home Phone". The user may be required to enter a password in order to use this feature. Once the menu entry is selected or appropriate key is pressed, the CAS is sent. Alternatively, steps 600 and 601 may be combined. That is, selection of the appropriate key or menu entry may both initiate the call (step 600) and send the CAS (step 601).

In step 602, the target CPE, upon receiving the CAS, sends an acknowledgement to the initiating CPE over the circuit that has been established between the two. In addition, both CPEs mute the transmission of audio or voice information over the circuit. The object is to avoid interference with the data communication that is about to occur. In the case in which the target CPE supports CLASS Type II Caller ID functionality, the acknowledgement signal comprises a DTMF 'D' signal; in the case in which the target CPE supports CLASS Type III Caller ID or ADSI-compatible functionality, the acknowledgement signal is a DTMF 'A' signal.

In step 603, the initiating CPE transmits header information to the target CPE in the form of FSK-encoded signals. The FSK-encoded signals are transmitted over the circuit that was established between the two units in step 600. Included in the header is an indicator indicating that the source of the transmission is a CPE in contrast to a SPCS server. Also included in the header is an indicator of the message type. Here, the indicator would indicate that this message is a request for a download of data stored by the target CPE.

In step 604, a communications protocol is established between the two CPEs. In one implementation, the protocol can and typically does deviate from the ADSI-compatible protocol. In one implementation example, the protocol that is agreed upon is a simplex mode of operation; in a second implementation example, it is a half-duplex mode of operation. In another implementation example, the user is presented with a voice prompt menu permitting direct voice selection of the available download options.

In step 605, the target CPE transmits the stored data to the initiating CPE. The data is transmitted in the form of FSK-encoded signals and, as described above, may comprise caller ID logs, address listings, email messages, or any other type of data stored by the CPE. In step 606, the initiating CPE displays and/or stores the data downloaded from the target CPE. In one implementation, the initiating CPE includes means for selective display and/or storage of the downloaded data. If the downloaded data is a caller ID log, for example, the user may scroll through the listing and, with respect to each call entry, either delete the entry or store the entry for future retrieval.

At decision step 607, the method loops back to step 605 if transmission of data from the target CPE to the initiating CPE is ongoing, and proceeds to step 608 when download of data from the target CPE is complete. At step 608, each unit un-mutes audio transmission and reception to allow voice communication to resume over the circuit.

The target CPE operates in accordance with the method previously described with respect to FIG. 6b. At step 407, the target CPE would transmit stored data to the initiating CPE in accordance with the protocol established for such a transmission.

As described with reference to the second embodiment, above, data transmission between the target and initiating CPE may occur alternatively over an acoustical channel. This method of data transmission may be advantageous when the two CPEs are proximate, rather than remote. Consistent with the Type II, Type III, and ADSI-compatible protocols, information is transmitted between the two CPEs at frequencies within the voice band. The acoustical channel comprises the speaker/earpiece and microphone of each CPE, and extends through the air between the CPEs.

Sixth Embodiment: Remote Testing of a CPE

Figure 13:
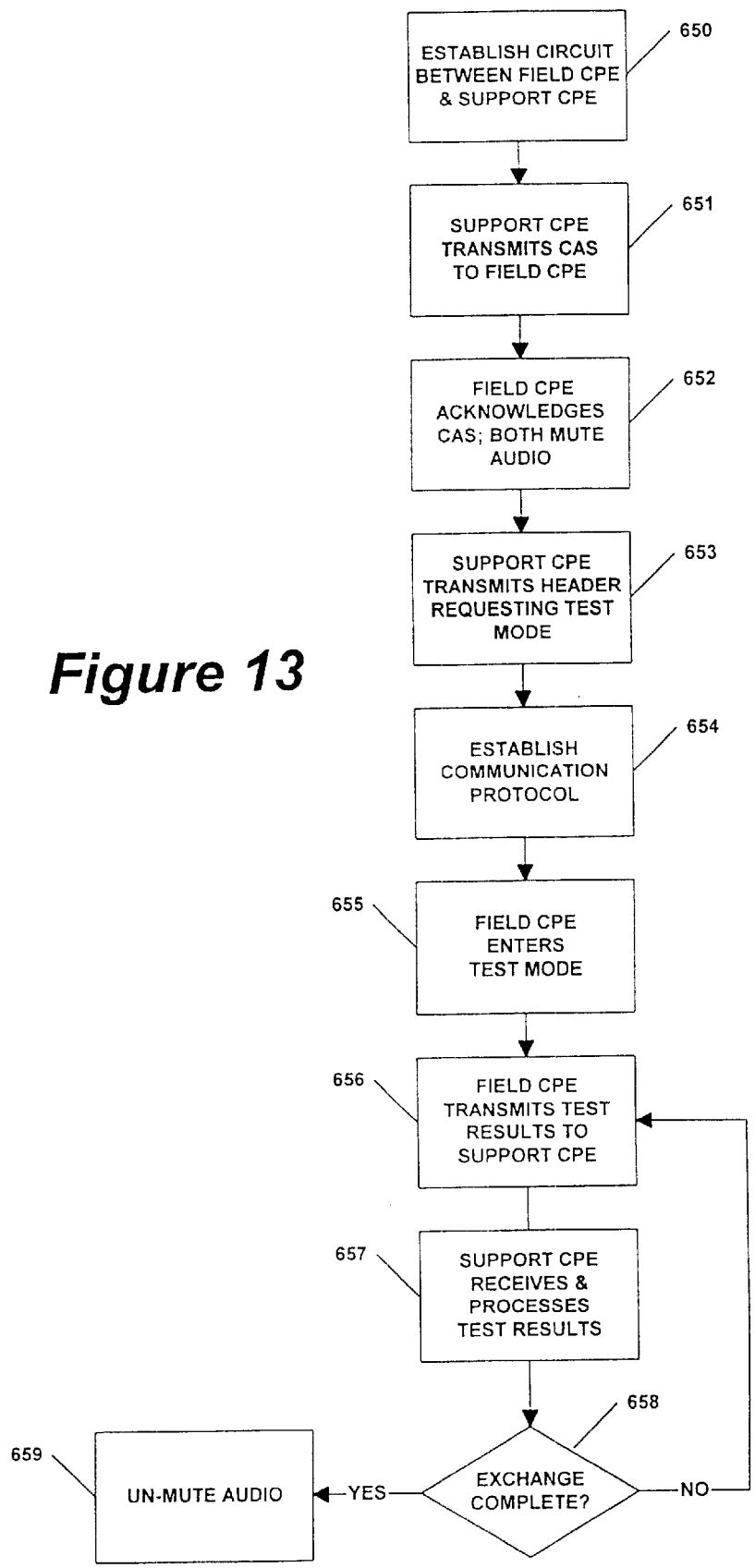
FIG. 13 illustrates a method of operation of a sixth embodiment of the subject invention wherein a CPE is remotely tested.

FIG. 13 illustrates a sixth embodiment of the subject invention wherein a CPE is remotely tested by a technical support center or entity. The customer or user CPE initiating the call is referred to as the "field CPE", and the CPE at the technical support center is referred to as the "support CPE". The field CPE may be any device configured to provide CLASS caller ID functionality, including wired or wireless dataphones, telephones, laptops, palm pilots and handsets. The dataphone described previously with reference to FIG. 3 is a suitable example. At a minimum, the field CPE must have a CAS detector, and an FSK receiver and generator. The support CPE must have a CAS generator, and an FSK receiver and generator.

In step 650, a circuit is established between the field CPE and the support CPE over a circuit-switching telecommunications network such as the PSTN. Typically, step 650 is initiated when a user having questions about, or trouble with, the features or performance of a field CPE manually rings a technical support center of the manufacturer of the field CPE, or any other appropriate and properly equipped support center. The question or difficulty prompting the call may relate to a particular CPE feature the user feels is not functioning properly, to a CPE feature that is lacking entirely, or to any other envisionable CPE-related issue. A user might ask, for example, why a particular type of Caller ID service on his phone is not working. At the outset it should be noted that, since the field CPE is used to place the initial call, the problems prompting the call are typically not of a type that the ability of the field CPE to place calls has been compromised.

A technical support person operating the support CPE answers the incoming call from the field CPE, thereby establishing a circuit between the two CPEs (step 650). Once the communication circuit has been established, the field user will explain to the support person the problem that the field CPE is experiencing. If the field CPE is a computer, the service agent may instruct the user to run a diagnostic or testing program.

If appropriate, once the problem has been sufficiently explained, the support person initiates a remote test of the field CPE. The user is instructed to remain on-line and, in step 651, the support CPE sends a CAS to the field CPE. This may be accomplished either manually or automatically, but will typically be done automatically. In one implementation, the support CPE includes a menu or keyboard system that provides options for remotely testing or interrogating a field CPE. A menu option might state, for example, "Interrogate Field CPE". A plurality of options may be provided for conducting a tests for a variety of situations on field CPEs. Once the appropriate testing option is selected, a CAS is sent from the support CPE to the field CPE. Alternatively, through appropriate action or selection of an appropriate option by the support person, the support CPE sends a CAS to the field CPE (step 651).

In step 652, the field CPE, upon receiving the CAS, sends an acknowledgement to the support CPE over the circuit that has been established between the two. In addition, both CPEs mute the transmission of audio or voice information over the circuit. The object is to avoid interference with the data communication that is about to occur. In the case in which the field CPE supports CLASS Type II Caller ID functionality, the acknowledgement signal comprises a DTMF 'D' signal; in the case in which the field CPE supports CLASS Type III Caller ID or ADSI-compatible functionality, the acknowledgement signal is a DTMF 'A' signal.

In step 653, the support CPE transmits header information to the field CPE in the form of FSK-encoded signals. The FSK-encoded signals are transmitted over the circuit that was established between the two units in step 650. Included in the header is an indicator indicating that the source of the transmission is a CPE in contrast to a SPCS server. Also included in the header is an indicator of the message type. Here, the indicator is deciphered by the field CPE as a request to enter a test mode and transmit test results or data back to the support CPE.

In step 654, a communications protocol is established between the two CPEs. In one implementation, the protocol can and typically does deviate from the ADSI-compatible protocol. In one implementation example, the protocol that is agreed upon is a simplex mode of operation; in a second implementation example, it is a half-duplex mode of operation.

In step 655, as instructed by the message header from the support CPE, the field CPE enters a test mode. Depending on the problem reported by the user, as reflected in the message header sent by the support CPE, this may range from a simple check to determine whether a feature has been installed to a full-blown self-test or diagnostic routine. In step 656, the field CPE transmits the test data or results generated in the test mode to the support CPE. Again, the data is transmitted in the form of FSK-encoded signals. In step 657, the support CPE receives and processes the results received from the field CPE. In one implementation, the support CPE includes means for selective display and/or storage of the test result data.

The test data transmitted from the field CPE to the support CPE will often provide the support person with sufficient information to answer the user's question. The resulting information, for example, may indicate whether the CPE is capable of receiving or providing an added value service. One specific application involves MEI (Multiple Extension Interworking), which requires that a CPE be capable of providing Type 2 Caller ID service while there are off-hook extensions on the line. Each of the off-hook extensions must be MEI capable. Hence, a user might telephone a technical support office to query about the availability of MEI (step 650). With the user's assistance, the support CPE could sequentially query each CPE connected to the line in order to determine whether each CPE is MEI capable.

A further example of this embodiment is in the area of providing telephone-based technical support to users of computers. While the user is on the phone with the technical support person, a dataphone transfer mechanism may be used by the support person to interrogate the user's computer. In this case, the technical support person may instruct the user to download a particular configuration file or to run a particular diagnostics program. When the diagnostic program is finished, the field CPE transmits the results to the support CPE for analysis.

This technique for remote testing may not be suitable for diagnosis of all faults. It may not, for example, be effective in detecting or diagnosing physical or mechanical damage or problems. It should, however, be able to detect and diagnose most user-induced errors and thereby significantly reduce the number of returns and on-site inspections that are required.

At decision step 658, the method loops back to step 656 if transmission of test results from the field CPE to the support CPE is ongoing, and proceeds to step 659 when download of test data from the field CPE is complete. At step 659, the field and support CPEs un-mute audio transmission and reception to allow voice communication to resume over the circuit. At this step, the technical support person may be able to advise the user based on the test results.

The field CPE operates in accordance with the method previously described with respect to FIG. 6*b*. At step 407, the field CPE would enter a test mode and transmit test results to the support CPE in accordance with the protocol established for such a transmission.

Seventh Embodiment: Remote Control of Home Appliances

Figure 14A:
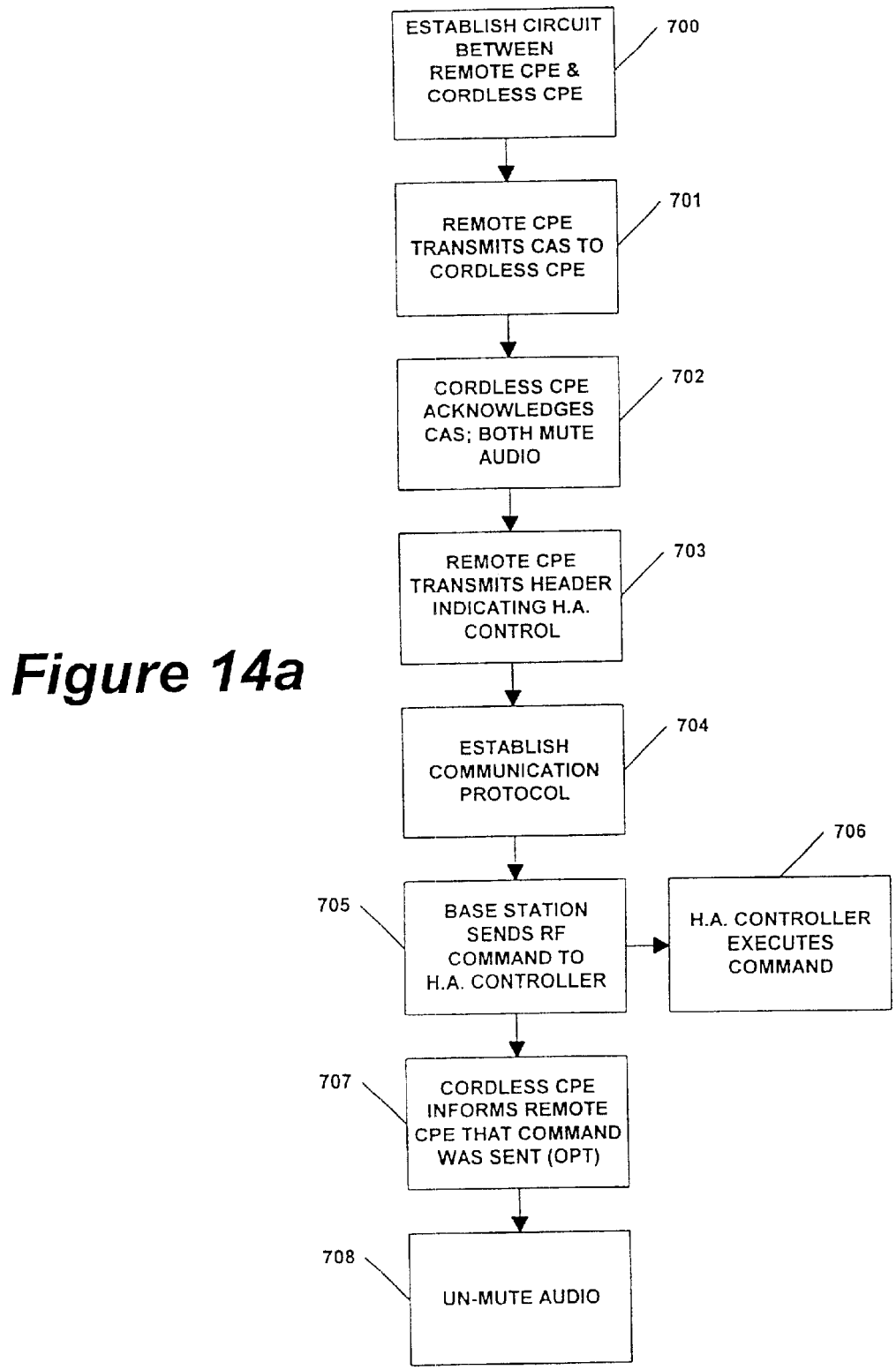
FIG. 14a illustrates a one-way method of operation of a seventh embodiment of the subject invention wherein home appliances are remotely controlled via a base station of a cordless CPE.
Figure 14B:
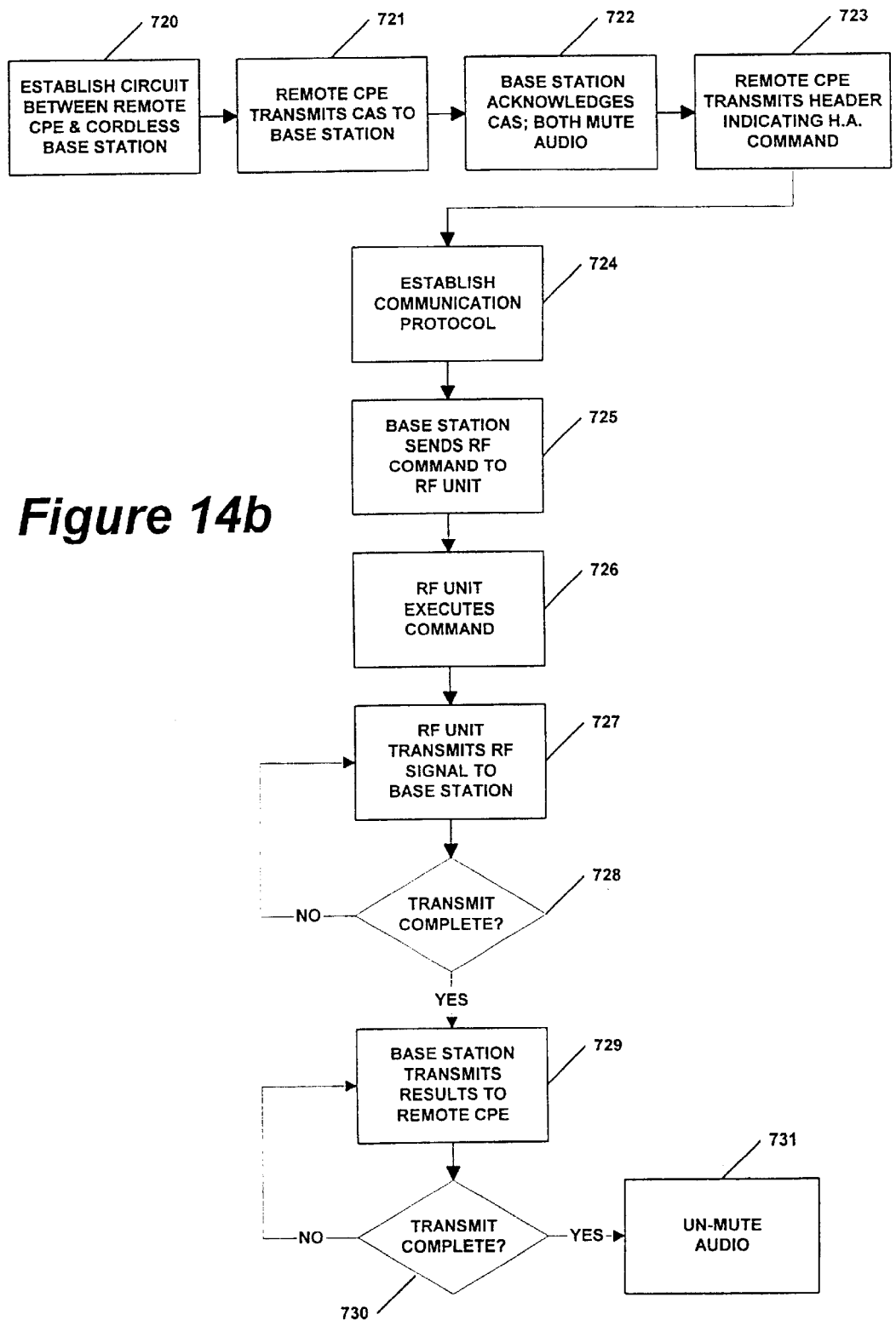
FIG. 14b illustrates a two-way method of operation of the seventh embodiment of the subject invention.

FIGS. 14*a–b* illustrate a seventh embodiment of the subject invention wherein a link is established between a remote CPE and the base station of a cordless CPE, and this link is used to control a network of RF units in the home. The remote CPE may be any device configured to provide CLASS caller ID functionality, including wired or wireless dataphones, telephones, laptops, palm pilots and handsets. The dataphone described previously with reference to FIG. 3 is a suitable example. The cordless CPE also has CLASS caller ID functionality, as well as an RF transmitter and receiver of the type conventional to cordless telephones.

This embodiment of the subject invention utilizes the RF transmission and reception abilities of the base station of a cordless CPE for communication with a network of RF units in the home. The RF units are appropriately attached to lights, appliances and other devices in the home (hereinafter "appliances"). If the RF units have only RF transmission capability, they may be used simply as on-off switches to turn the appliances on and off. In the description below, this is referred to as a "one-way" mode of operation and is depicted in FIG. 14a. If, conversely, the RF units have both transmission and reception capability, they can also be used to query the status of the various appliances. In the description below, this is referred to as a "two-way" mode of operation and is depicted in FIG. 14b. The use and operation of RF units for the control of home appliances is well known to those of skill in the art and will not be described in detail herein.

The one-way mode of operation is first described with reference to FIG. 14a. At a minimum, the remote CPE must have CAS and FSK generators. The cordless CPE must have a CAS detector and an FSK receiver. Also, as described above, the cordless CPE has a conventional RF transmitter and receiver. The RF units connected to the home appliance must have at least an RF receiver for one-way operation.

In step 700, a circuit is established between the remote CPE and the cordless CPE over a circuit-switching telecommunications network such as the PSTN. Typically, a remote user seeking to change the active state of her home appliances initiates step 700. In one implementation example, the circuit is established when the remote CPE calls the cordless CPE, and the cordless CPE receives the call, that is, places itself in an off-hook condition. Typically, the remote CPE would be a remote device such as a wireless dataphone and the cordless CPE is at the user's home or office. Both CPEs possess CLASS caller ID functionality.

In step 701, the remote CPE sends a CAS to the cordless CPE over the circuit that has been established between the two in step 700. This may be accomplished in a number of ways, either manually or automatically. In one implementation, the remote CPE includes a menu or keyboard system that provides options for home appliance control. If the remote CPE is a computer, an interactive display depicting the status of each controllable home appliance might be used. In any event, the user may be required to enter a password or comply with other security procedures. Once appropriate option is selected, the CAS is sent. Alternatively, steps 700 and 701 may be combined. That is, selection of the appropriate key or menu entry may both initiate the call (step 700) and send the CAS (step 701).

In step 702, the cordless CPE, upon receiving the CAS, sends an acknowledgement to the remote CPE over the circuit that has been established between the two. In addition, both CPEs mute the transmission of audio or voice information over the circuit. The object is to avoid interference with the data communication that is about to occur. In the case in which the cordless CPE supports CLASS Type II Caller ID functionality, the acknowledgement signal comprises a DTMF 'D' signal; in the case in which the cordless CPE supports CLASS Type III Caller ID or ADSI-compatible functionality, the acknowledgement signal is a DTMF 'A' signal.

In step 703, the remote CPE transmits header information to the cordless CPE in the form of FSK-encoded signals. The FSK-encoded signals are transmitted over the circuit that was established between the two units in step 700. Included in the header is an indicator indicating that the source of the transmission is a CPE in contrast to an SPCS server. Also included in the header is an indicator of the message type. Here, the indicator is a request for control of home appliances via the cordless base station.

In step 704, a communications protocol is established between the two CPEs. In one implementation, the protocol can and typically does deviate from the ADSI-compatible protocol. In one implementation example, the protocol that is agreed upon is a simplex mode of operation; in a second implementation example, it is a half-duplex mode of operation. In another implementation example, the user is presented with a voice prompt menu to permit direct voice control over the home appliances.

In step 705, as instructed by the message header from the remote CPE, the base station of the cordless CPE transmits an appropriate RF command to the home units. The RF units may be either uniquely addressable, in which case they are individually controllable, or they may all respond to the same signal, in which case they will all be "on" or "off". If the units are uniquely addressable, the remote user will be presented with options for control of each appliance, and an appropriate message will be sent to the cordless CPE for control of the selected appliance. A much simpler operation occurs if the units are only globally addressable; the user is presented with the simple option of switching all appliances either on or off.

In step 706 the RF unit(s), upon receiving an RF command from the cordless base station, switch states to turn the associated home appliance(s) either on or off. As this mode of operation is one-way and the cordless CPE cannot confirm whether the RF unit has carried out the command, the method may proceed directly to un-muting of the audio in step 708. If, however, confirmation that the base station sent the command to the RF units is desired, an additional step 707 may be carried out. In step 707, based on the communication protocol established in step 704, the cordless CPE transmits an FSK-encoded signal to the remote CPE confirming that it sent an RF command to the RF units as instructed. If step 707 is to be performed, the cordless CPE must be equipped with an FSK generator and the remote CPE must have an FSK receiver. Following step 707, once the confirmation has been sent, the remote and cordless CPEs un-mute audio transmission and reception to allow voice communication to resume over the circuits.

The remote CPE operates in accordance with the method previously described with respect to FIG. 6b. At step 402, the cordless CPE might receive a standard caller ID message header, in which case it proceeds to step 403; or it might receive a message header requesting home appliance control, in which case it proceeds to step 406. At step 407, the cordless CPE would issue an RF command to the RF unit(s) and (optionally) transmit confirmation back to the remote CPE in accordance with the protocol established for such a transmission.

The two-way mode of operation is now described with reference to FIG. 14b. For two-way operation, both the remote and cordless CPEs must be equipped with FSK generators and receivers. Additionally, the RF units connected to the home appliances must have RF transmission and reception capability.

Steps 720–725 are functionally identical to steps 700–705 of FIG. 14a for one-way operation. A circuit is established between the remote and cordless CPEs (step 720); the remote CPE sends a CAS to the cordless CPE (step 721); the cordless CPE acknowledges (step 722); the remote CPE transmits and FSK-encoded header (step 723); a communications protocol is established (step 724); and the base station sends an appropriate RF command to the RF unit(s) (step 725). In this mode of operation, since the RF units have transmission and reception capability, the user has a higher degree of control over the appliances. In addition to simply switching the appliances on and off, the user may instruct the cordless CPE to query the appliances about their status. Additionally, if an appliance is turned on or off, the RF unit may transmit confirmation to the cordless base station that this operation has actually been carried out. In step 726, then, the RF unit executes the command received from the cordless base station. It may turn an appliance on or off, check a thermostat, dim the lights, start a coffee pot or VCR, or any other envisionable type of home appliance control. In step 727, the RF unit sends an RF signal back to the base station. This signal may contain the results of a status query, confirmation that an operation has been carried out, a temperature, etc. Again, the possibilities for data transfer are many and may range from the very simple to the very complex.

At decision step 728, the method loops back to step 727 if transmission of RF data from the RF unit to the cordless base station is ongoing, and proceeds to step 729 when transmission of RF data is complete. At step 729, the cordless CPE transmits the data received from the RF units to the remote unit in the form of FSK-encoded signals. Again, this data may be fairly simple, such as the results of a status query or confirmation of an on/off state, or it may be more complex, such as audio or visual data. The complexity possible will depend on the transmission, reception, storage and display capacity of the remote and cordless CPEs, as well as the RF units.

The remote CPE displays and/or stores the data received from the cordless CPE. The format and/or display of the data will, again, depend on the form of the remote CPE. If the remote CPE is a wireless phone with a simple LCD display, the display will likely be limited to a simple text message, whereas if the remote CPE is a laptop computer, the display and storage options may be much more extravagant.

At decision step 730, the method loops back to step 729 if transmission of data from the cordless CPE to the remote CPE is ongoing, and proceeds to step 731 when transmission of data is complete. At step 731, each unit un-mutes audio transmission and reception to allow voice communication to resume over the circuit.

Eighth Embodiment: Remotely Configuring or Upgrading a CPE

Figure 15:
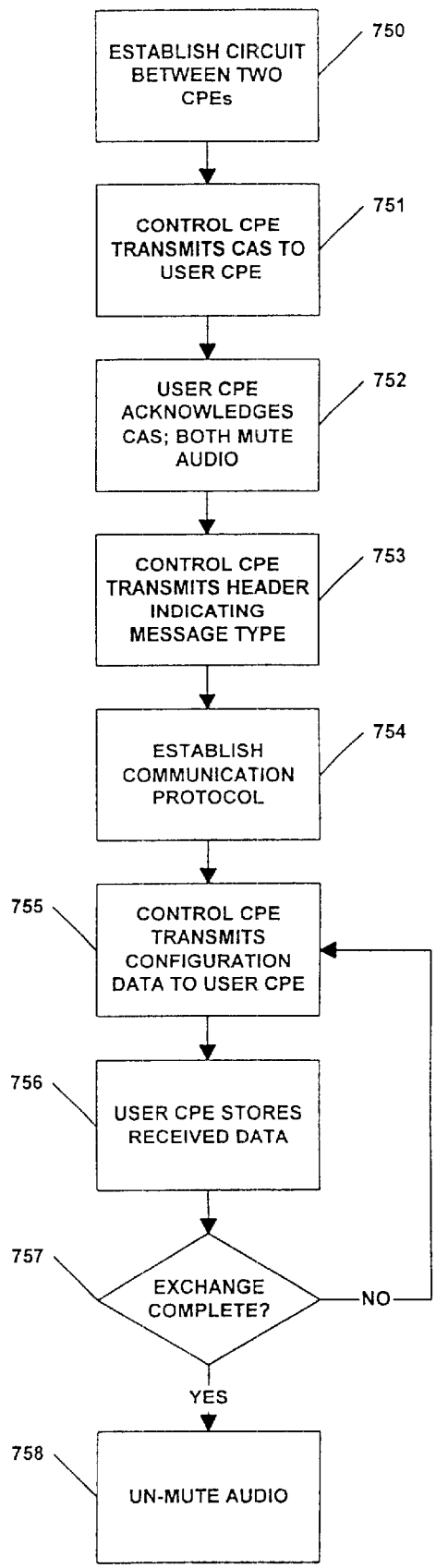
FIG. 15 illustrates a method of operation of an eighth embodiment of the subject invention wherein a user CPE is remotely configured or upgraded by another CPE.

FIG. 15 illustrates an eighth embodiment of the subject invention wherein a user CPE is remotely configured or upgraded by a control CPE. The CPEs may be any devices configured to provide CLASS caller ID functionality, including wired or wireless dataphones, telephones, laptops, palm pilots and handsets. The user CPE must have, at a minimum, a CAS detector, and an FSK receiver, and the control CPE must have a CAS generator and an FSK generator. In one implementation, the user CPE is a dataphone of the type described previously with reference to FIG. 3, and the control CPE is a home or manufacturer controlled PC having CLASS caller ID functionality.

The configuration or upgrade data transmitted from the control CPE to the user CPE may be any type of data stored in the non-volatile memory of the dataphone. In one implementation, the transmitted data comprises user-selectable options such as volume setting, display format, and the like. In step 750, a circuit is established between two CPEs over a circuit-switching telecommunications network such as the PSTN. In one implementation, the circuit comprises a channel configured to transmit frequencies within the voice band. In one implementation example, the circuit is established when the control CPE calls the user CPE, and the user CPE receives the call, that is, places itself in an off-hook condition. Alternatively, the circuit may be established by the user CPE calling the control CPE. Where both the user and control CPE are home-based, the circuit may be established by connecting a physical phone line between the two (i.e. transfer the PC modem-to-wall socket connection from the wall socket to the user CPE), or by placing the user and control CPEs in close enough proximity for an acoustical coupling.

In step 751, the control CPE sends a CAS to the user CPE over the circuit that has been established between the two in step 750. This may be accomplished in a number of ways, either manually or automatically. As described above, the control CPE is typically a home or manufacturer-based PC. In one implementation example, in the case of a home-based control PC, the phone has an associated software interface which is loaded into the PC. The software interface prompts the user to select operating options or configurations, and once complete, the control CPE initiates transmission of the configuration data to the user CPE by sending a CAS to the user CPE. Hence, the user may purchase a dataphone and, using the provided software package, program or configure the phone to her tastes. In the case of a manufacturer-based control computer (CPE), the user may have purchased additional options or requested an upgrade from the manufacturer. The user phone may have built-in features that must be enabled by the manufacturer, or the control CPE might be a central database containing telephone profiles that can be transferred to individual phones (user CPEs) to personalize the phones to specific needs or desires. The control CPE initiates transmission of the upgrade or enabling data to the user CPE by sending a CAS to the user CPE. Steps 750 and 751 may be combined. That is, selection of the appropriate key or menu entry may both initiate the call (step 750) and send the CAS (step 751).

In step 752, the user CPE, upon receiving the CAS, sends an acknowledgement to the control CPE over the circuit that has been established between the two. In addition, both CPEs mute the transmission of audio or voice information over the circuit. The object is to avoid interference with the data communication that is about to occur. In the case in which the user CPE supports CLASS Type II Caller ID functionality, the acknowledgement signal comprises a DTMF 'D' signal; in the case in which the user CPE supports CLASS Type III Caller ID or ADSI-compatible functionality, the acknowledgement signal is a DTMF 'A' signal.

In step 753, the control CPE transmits header information to the user CPE in the form of FSK-encoded signals. The FSK-encoded signals are transmitted over the circuit that was established between the two units in step 750. Included in the header is an indicator indicating that the source of the transmission is a CPE in contrast to an SPCS server. Also included in the header is an indicator of the message type. Here, the indicator would indicate that this message is a transmission of upgrade or configuration data to be stored in the non-volatile memory of the user CPE.

In step 754, a communications protocol is established between the two CPEs. In one implementation, the protocol can and typically does deviate from the ADSI-compatible protocol. In one implementation example, the protocol that is agreed upon is a simplex mode of operation; in a second implementation example, it is a half-duplex mode of operation. In another implementation example, the user is presented with a voice prompt menu permitting direct voice selection of the available download options.

In step 755, the control CPE transmits the upgrade or configuration data to the user CPE. The data is transmitted in the form of FSK-encoded signals and, as described above, may comprise configuration settings, option upgrades, software patches, or any other type of data that can be transmitted from the control CPE to the user CPE. In step 756, the user CPE stores the data transmitted by the control CPE. At decision step 757, the method loops back to step 755 if transmission of data from the control CPE to the user CPE is ongoing, and proceeds to step 758 when download of data from the target CPE is complete. At step 758, each unit un-mutes audio transmission and reception to allow voice communication to resume over the circuit.

The user CPE operates in accordance with the method previously described with respect to FIG. 6b. At step 407, the user CPE would receive configuration or upgrade data from the control CPE in accordance with the protocol established for such a transmission.

As mentioned above, data transmission between the target and initiating CPE may occur alternatively over an acoustical channel. This method of data transmission may be advantageous when the two CPEs are proximate, rather than remote. Consistent with the Type II, Type III, and ADSI-compatible protocols, information is transmitted between the two CPEs at frequencies within the voice band. The acoustical channel comprises the speaker/earpiece and microphone of each CPE, and extends through the air between the CPEs.

While particular embodiments of the present invention have been described above, it should be understood that they have been presented by way of example only, and not as limitations. The breadth and scope of the present invention is defined by the following claims and their equivalents, and is not limited by the particular embodiments, implementations and implementation examples described herein.

What is claimed is:

1. A method of downloading stored data from a remote peer device to a calling peer device using pre-existing CLASS caller ID protocol, the method comprising the following steps:

(a) establishing an interface with the calling peer device;
    (b) monitoring the interface for incoming FSK-encoded data;
    (c) when FSK-encoded data is detected, analyzing the FSK-encoded data to determine whether it came from a caller ID server or the calling peer device;
    (d) if the FSK-encoded data came from a caller ID server, performing the pre-existing CLASS caller ID protocol to decode and display incoming caller ID information; and
    (e) if the FSK-encoded data came from the calling peer device and is a request for downloading of stored data, establishing a communications protocol with the calling peer device and downloading the stored data to the calling peer device.

2. A method as claimed in claim 1, wherein the remote peer device and calling peer device are wired or wireless dataphones, telephones, laptop computers, palm pilots or wireless handsets.

3. A method as claimed in claim 1, wherein the stored data comprise caller ID logs, address or contact listings; or email messages.

4. A method as claimed in claim 1, wherein in step (a) the interface is established over a circuit-switching telecommunications network or by placing the devices sufficiently proximate for an acoustical coupling.

5. A method as claimed in claim 1, wherein in step (c), a header in the FSK-encoded data indicates whether the data came from a caller ID server or the calling peer device.

6. A method of receiving upgrade or configuration data from a control peer device with a remote peer device using pre-existing CLASS caller ID protocol, the method comprising the following steps:

(a) establishing an interface with the control peer device;
    (b) monitoring the interface for incoming FSK-encoded data;
    (c) when FSK-encoded data is detected, analyzing the FSK-encoded data to determine whether it came from a caller ID server or the control peer device;
    (d) if the FSK-encoded data came from a caller ID server, performing the pre-existing CLASS caller ID protocol to decode and display incoming caller ID information; and
    (e) if the FSK-encoded data came from the control peer device, establishing a communications protocol with the control peer device and receiving the upgrade or configuration data from the control peer device.

7. A method as claimed in claim 6, wherein the control peer device is a personal computer and the remote peer device is a dataphone, and wherein the personal computer is loaded with software configured to interface with the dataphone.

8. A method as claimed in claim 6, wherein the upgrade or configuration data comprises configuration settings, option upgrades or software patches.

9. A method as claimed in claim 6, wherein in step (a) the interface is established over a circuit-switching telecommunications network, via connection of a physical phone line between the two devices, or by placing the devices sufficiently proximate for an acoustical coupling.

10. A method as claimed in claim 6, wherein in step (c), a header in the FSK-encoded data indicates whether the data came from a caller ID server or the control peer device.

* * * * *